United States Patent

Zaitsu et al.

[11] Patent Number: 5,805,432
[45] Date of Patent: Sep. 8, 1998

[54] RESONANT DC-DC CONVERTER CAPABLE OF CONTROLLING BY PULSE WIDTH MODULATION

[75] Inventors: Toshiyuki Zaitsu, Tokyo; Tamotsu Ninomiya, Fukuoka, both of Japan

[73] Assignee: NEC Corporation, Japan

[21] Appl. No.: 637,368

[22] Filed: Apr. 25, 1996

[30] Foreign Application Priority Data

Sep. 26, 1995 [JP] Japan ................................. 7-247525

[51] Int. Cl.⁶ .................................................. H02M 3/335
[52] U.S. Cl. ............................... 363/16; 363/20; 363/24; 363/39; 363/97
[58] Field of Search ......................... 363/15, 16, 20, 363/21, 24, 25, 26, 39, 40, 41, 97, 131

[56] References Cited

U.S. PATENT DOCUMENTS

| | | | |
|---|---|---|---|
| 4,253,136 | 2/1981 | Nanko | 363/21 |
| 5,066,900 | 11/1991 | Bassett | 363/20 X |
| 5,159,541 | 10/1992 | Jain | 363/131 X |
| 5,343,079 | 8/1994 | Mohan et al. | 363/40 X |
| 5,430,633 | 7/1995 | Smith | 363/20 |
| 5,490,052 | 2/1996 | Yoshida et al. | 363/15 |

FOREIGN PATENT DOCUMENTS 2-151266  6/1990  Japan .

OTHER PUBLICATIONS

S. Asou, et al., "Current–Resonant Type (SMZ) Converter", Sanken Technical Report, vol. 26, No. 1, 1994, pp. 11–22.

*Primary Examiner*—Peter S. Wong
*Assistant Examiner*—Y. J. Han
*Attorney, Agent, or Firm*—Ostrolenk, Faber, Gerb & Soffen, LLP

[57] ABSTRACT

In a resonant DC-DC converter for converting a d.c. input voltage into a d.c. output voltage, a main switching element (3) switches the d.c. input voltage under control of switching pulses to supply an a.c. voltage to a primary side of a transformer (4). A resonant circuit (5) is provided at a secondary side of the transformer. A clamp circuit is connected to the main switching element and comprises a first capacitor (2-1) and an auxiliary switching element (2-2) serially connected to the first capacitor. The main and the auxiliary switching elements are alternately put into an on state under control of the switching pulses.

20 Claims, 27 Drawing Sheets

RESONANT DC-DC CONVERTER CAPABLE OF CONTROLLING BY PULSE WIDTH MODULATION

BACKGROUND OF THE INVENTION

This invention relates to a resonant DC-DC converter capable of controlling by pulse width modulation. Such a resonant DC-DC converter is particularly useful in a switching power source device which is used in various electronic devices.

Such a resonant DC-DC converter is disclosed in Japanese Unexamined Patent Publication No. 151266/1990 (Tokkai Hei 2-151266) and is called hereinafter a first example. In the first example, the converter comprises a switching circuit which is connected to a primary side of a transformer. The switching circuit comprises first and second power transistors which are supplied with a d.c. input voltage. In order to carry out switching operation, the first and the second power transistors are alternately put into an on state in accordance with switching pulses. As a result of the switching operation, the transformer converts the d.c. input voltage into an a.c. voltage. The a.c. voltage is rectified by a rectifier circuit and then smoothed by a smoothing circuit. The smoothing circuit produces a smoothed voltage as an d.c. output voltage. The converter further comprises a switching frequency control circuit for generating the switching pulses by the use of the d.c. output voltage.

As a second example of the resonant DC-DC converter, a current resonant converter is disclosed in Sanken Technical Report Vol. 26, No. 1, pp. 11–22, 1994. In the second example, the current resonant converter comprises a switching circuit which comprises first and second switching elements connected to a primary side of a transformer. The first and the second switching elements are for carrying out soft switching operation and are alternately put into the on state by frequency control operation. An output voltage of the transformer is rectified and then smoothed in the same manner as the first example.

In the first and the second examples, the switching circuit is controlled by the frequency control operation because the switching circuit is a half-bridge type. In this case, it is required to design the converter in a minimum frequency within a variable frequency range. This means that it is hard to minimize the converter because it is restricted to minimize the transformer and a choke coil which are used in the converter. Furthermore, it is hard to take any countermeasure against noises because a noise frequency varies.

SUMMARY OF THE INVENTION

It is therefore an object of this invention to provide a resonant DC-DC converter which is capable of utilizing PWM (pulse width modulation) control in order to control a switching circuit.

It is another object of this invention to provide the resonant DC-DC converter which is capable of utilizing the PWM control together with frequency control.

It is further object of this invention to provide the resonant DC-DC converter which is capable of decreasing a size thereof.

It is still further object of this invention to provide the resonant DC-DC converter which is capable of taking countermeasure against noises.

On describing the gist of this invention, it is possible to understand that a resonant DC-DC converter is for converting a d.c. input voltage into a predetermined d.c. output voltage. The converter comprises main switching means for switching the d.c. input voltage under control of switching pulses to supply an a.c. voltage to a primary side of a transformer, a rectifier circuit connected to a secondary side of the transformer for rectifying an a.c. voltage derived from the secondary side to produce a rectified voltage, and a smoothing circuit connected to the rectifier circuit for smoothing the rectified voltage to produce a smoothed voltage as the predetermined d.c. output voltage.

According to this invention, the converter further comprises a resonant circuit provided at least one of the primary and the secondary sides of the transformer, and a clamp circuit connected to the main switching means and comprising a first capacitor and a subsidiary switching means both of which are serially connected. The main and the subsidiary switching means are alternately put into an on state under control of the switching pulses.

DESCRIPTION OF THE PREFERRED EMBODIMENTS

Figure 1:
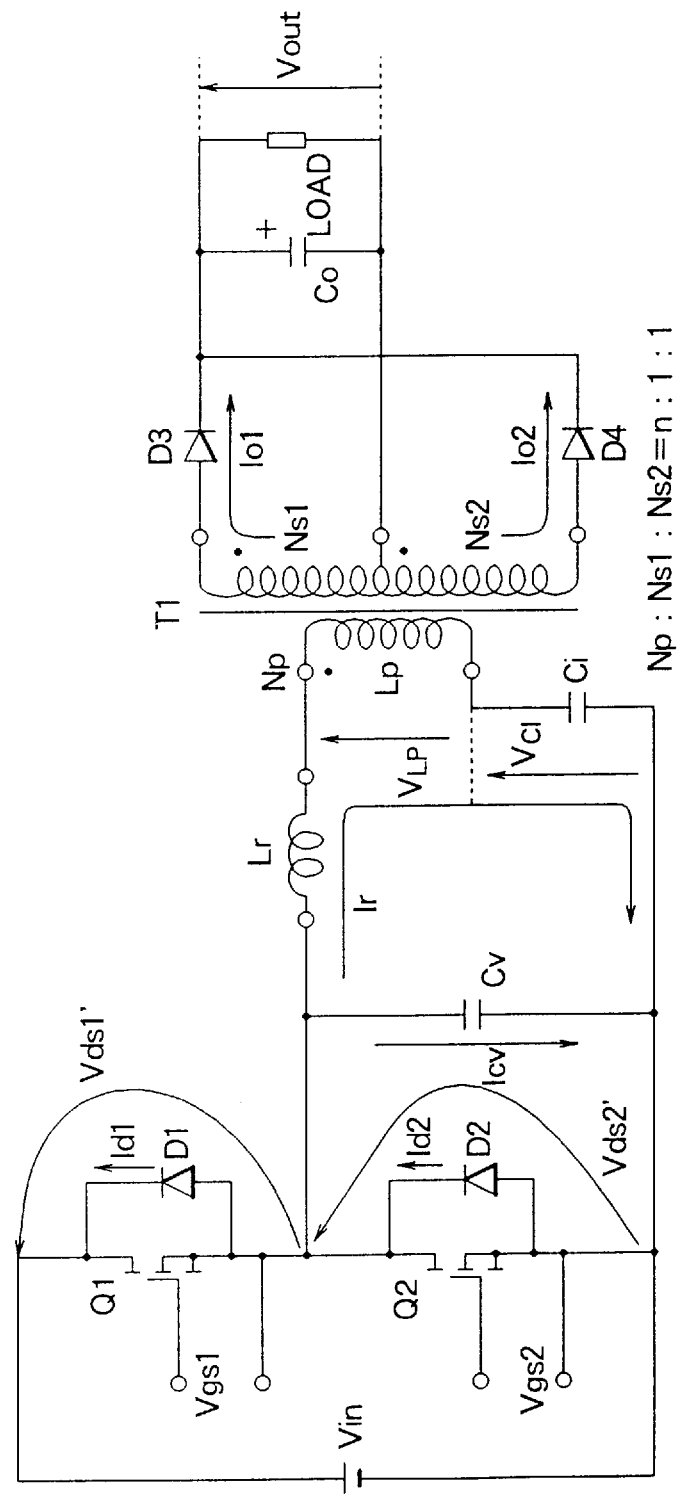
FIG. 1 shows a circuit diagram of a conventional resonant DC-DC converter.
Figure 2:
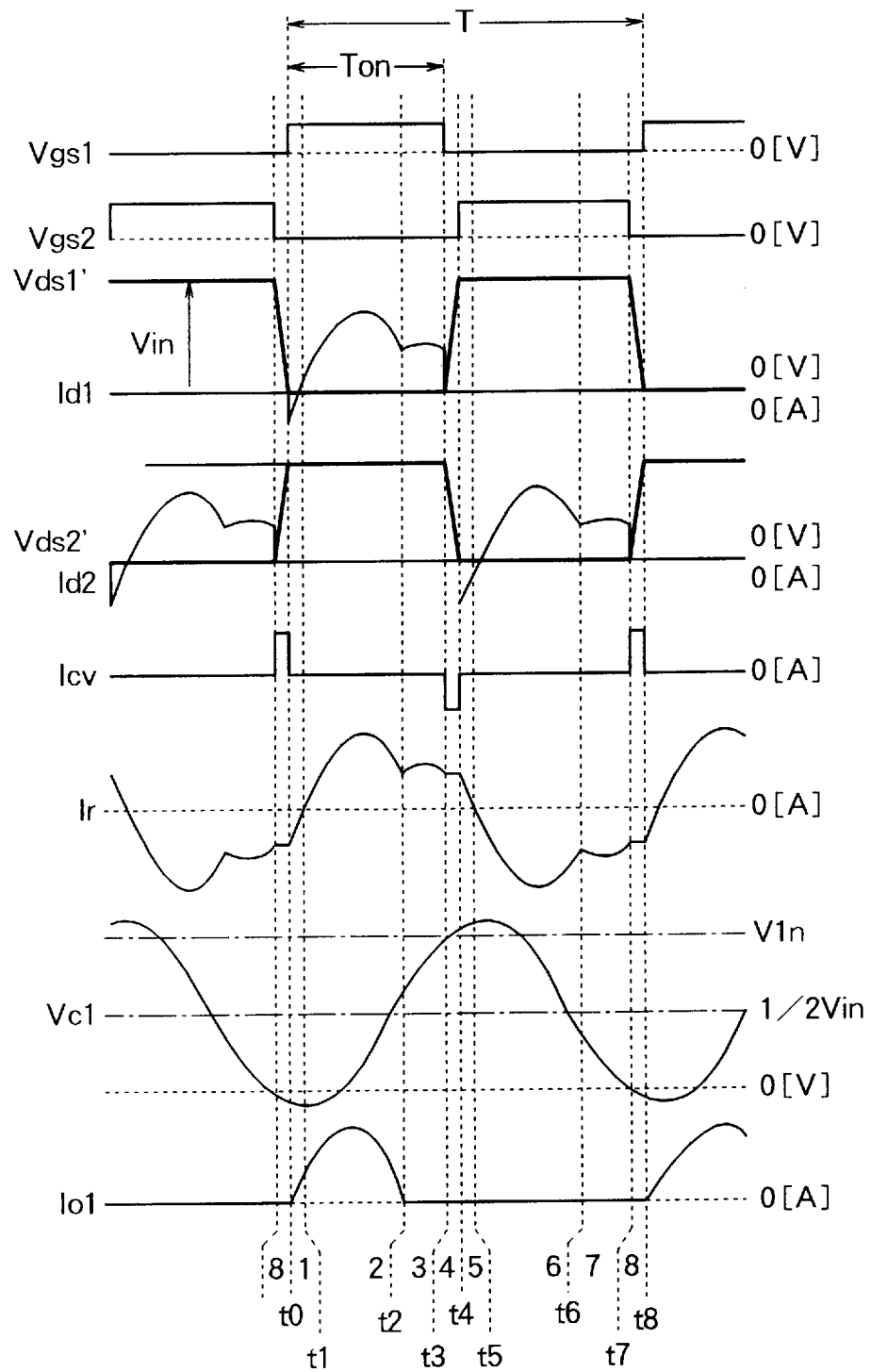
FIG. 2 shows waveforms for use in describing operation of the resonant DC-DC converter illustrated in FIG. 1.
Figure 3:
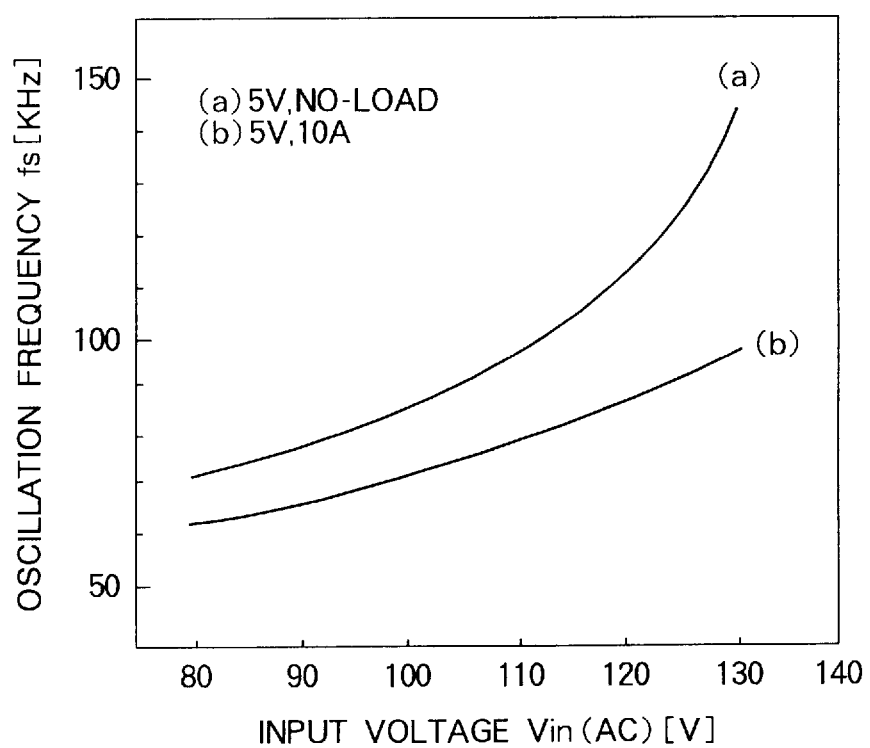
FIG. 3 shows input voltage versus oscillation frequency characteristic for use in describing operation of the resonant DC-DC converter illustrated in FIG. 1.

Referring to FIGS. 1 to 3, a conventional resonant DC-DC converter will be described at first in order to facilitate an understanding of this invention. The resonant DC-DC converter is of the type described in background of the Invention as the second example.

In FIG. 1, the resonant DC-DC converter comprises a transformer T1 and a switching circuit comprising first and second switching elements Q1 and Q2. The first and the second switching elements Q1 and Q2 are serially connected to a d.c. power source having an input voltage Vin. The first and the second switching elements Q1 and Q2 are connected to a primary side, namely, a primary coil, of the transformer T1 through a capacitor Cv and a serial resonant circuit comprising an inductor Lr and a capacitor C1. The first and the second switching elements Q1 and Q2 are alternately put into an on state under control of first and second switching pulses, namely, gate pulses, Vgs1 and Vgs2. As illustrated in a top line in FIG. 2, the first and the second switching pulses Vgs1 and Vgs2 are defined by a duty ratio D (=Ton/T). The first and the second switching pulses Vgs1 and Vgs2 are generated by a switching pulse generation circuit (not shown) by the use of a d.c. output voltage Vout. As illustrated in a second line in FIG. 2, a voltage waveform Vds1' of the first switching element Q1 is illustrated by a rectangle waveform having an amplitude voltage equal to Vin.

If the voltage waveform Vds1' is applied to Fourier expansion by the use of the duty ratio D, the voltage waveform Vds1' is represented by a first equation (1) given by:

$$Vds1'(x) = Vin \left\{ D + \frac{2}{\pi} \left( -\sin D\pi \cos x + \frac{1}{2} \sin 2D\pi \cos 2x - \frac{1}{3} \sin 3D\pi \cos 3x + \ldots \right) \right\}. \quad (1)$$

In this event, if attention is directed to a first term of an a.c. component because only a fundamental wave component, namely, the first term of the a.c. component in the first equation (1) can reach the serial resonant circuit, an amplitude |Vds1'ac| thereof is represented by a second equation (2) given by;

$$|Vds1'ac| = Vin \frac{2}{\pi} \sin D\pi. \quad (2)$$

According to the second equation (2), since the amplitude |Vds1'ac| varies in the form of a sine wave to the duty ratio D, the amplitude |Vds1'ac| varies nonlinearly to the variation of the duty ratio D when the duty ratio D is within the range of 0.2–0.5. Especially, when the duty ratio D is near the range of 0.3–0.5, the amplitude |Vds1'ac| has a little variation even if the duty ratio D has the variation as shown by dotted line in FIG. 4. Moreover, when the duty ratio D is smaller than 0.2, a switching loss increases because a switching pulse width is too narrow. As a result, the resonant DC-DC converter has a degraded efficiency. Under the circumstances, the duty ratio D is practically determined at a variable range of 0.2–0.5. This means that it is impossible to control the resonant DC-DC converter by PWM (pulse width modulation) control by the use of the duty ratio D.

In FIG. 3, if the attention is directed to a case (b) of the output voltage of 5 (V) and an output current of 10 (A), an oscillation frequency fs changes from 60 (kHz) to 90 (kHz) (1.5 times) when the input voltage Vin changes from 80 (V) to 130 (V) (1.6 times).

Figure 5:
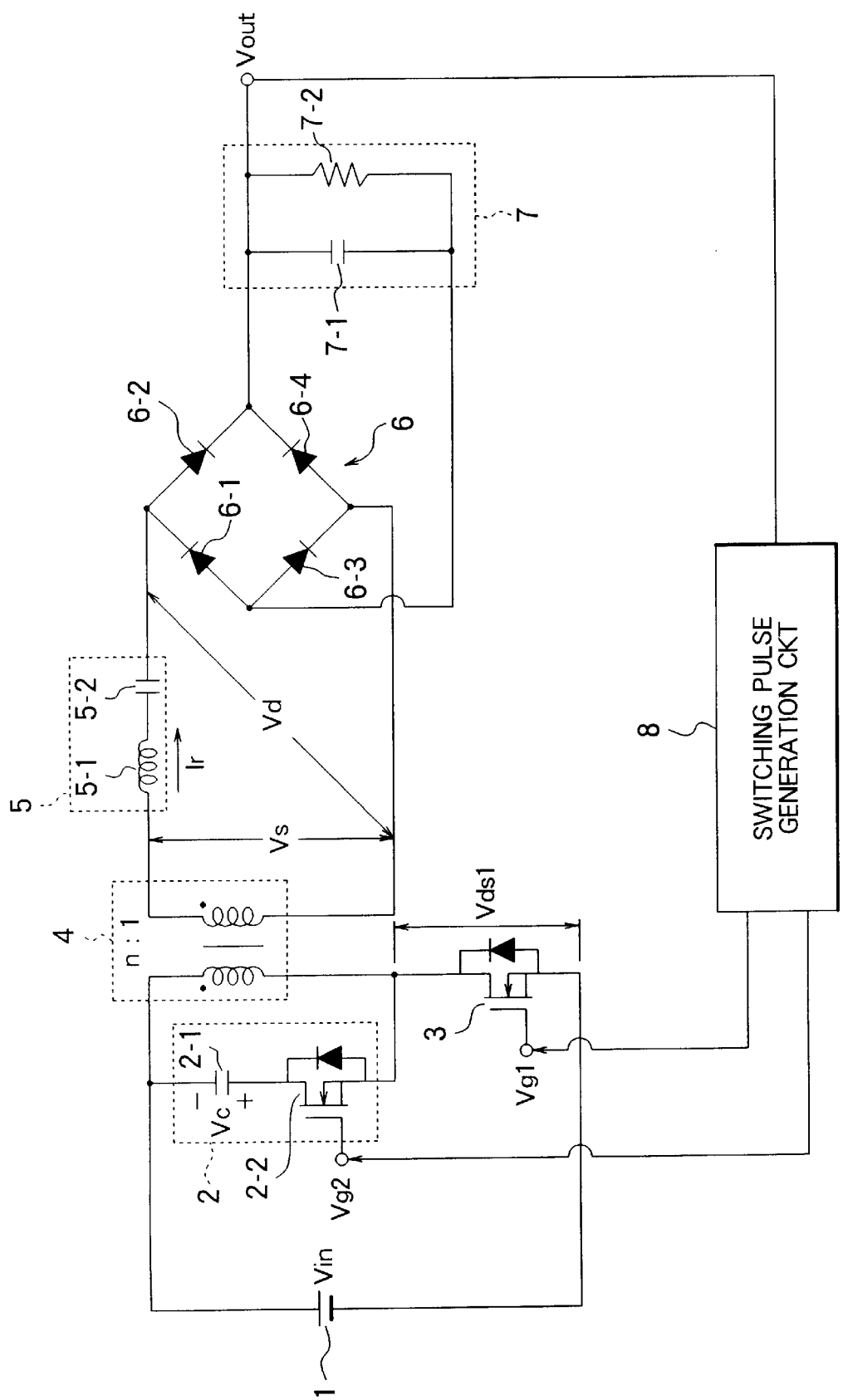
FIG. 5 shows a circuit diagram of a resonant DC-DC converter according to a first embodiment of this invention.
Figure 6:
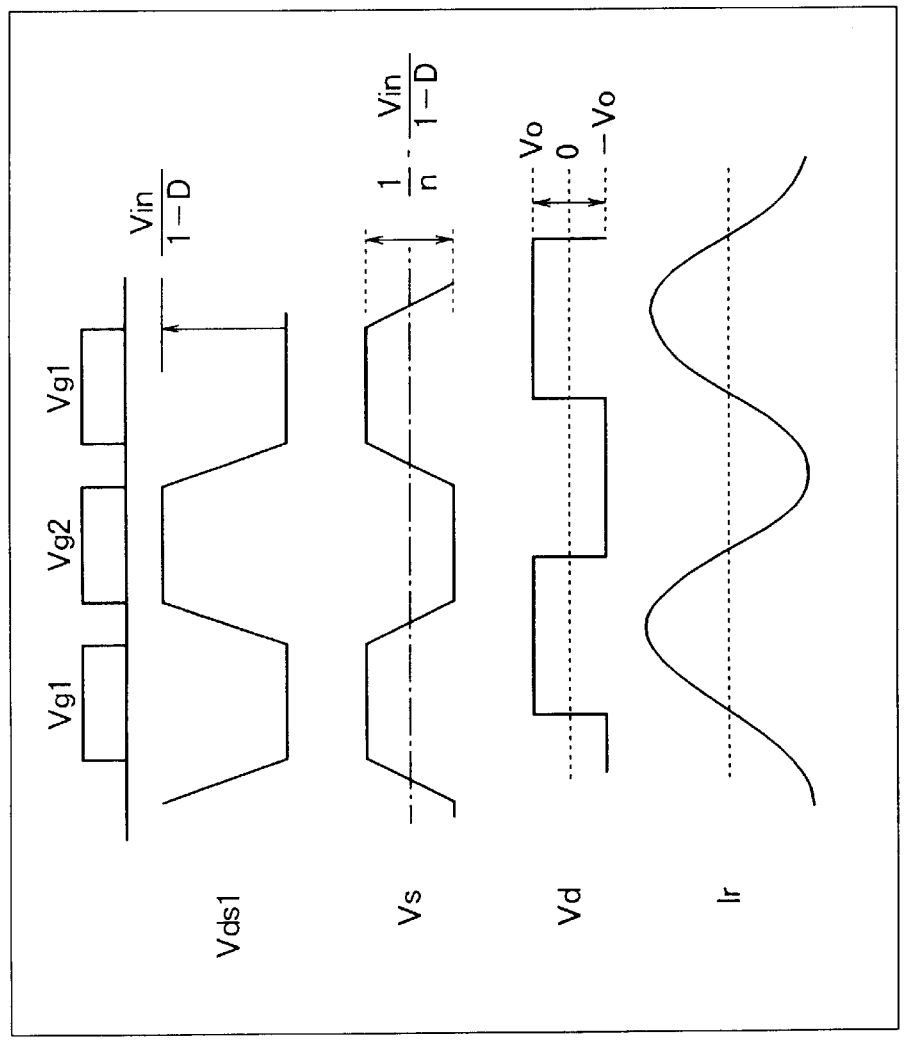
FIG. 6 shows waveforms for use in describing operation of the resonant DC-DC converter illustrated in FIG. 5.

Referring to FIGS. 5 and 6, the description will proceed to a resonant DC-DC converter according to a first embodiment of this invention. The resonant DC-DC converter comprises a d.c. power source 1 having an input voltage Vin, a clamp circuit 2 connected to the d.c. power source 1, a main switching element 3 connected to the d.c. power source 1 and the clamp circuit 2, and a transformer 4. The clamp circuit 2 comprises a first capacitor 2-1 and an auxiliary switching element 2-2 serially connected to the first capacitor 2-1. The clamp circuit 2 is connected in parallel to a primary side, namely, a primary coil, of the transformer 4 while the main switching element 3 is serially connected to the primary side of the transformer 4. As will be described later in detail, the main and the auxiliary switching elements 3 and 2-2 are alternately put into an on state under control of first and second switching pulses, namely, gate pulses, Vg1 and Vg2. In other words, the main and the auxiliary switching elements 3 and 2-2 carry out switching operation of the input voltage Vin.

The resonant DC-DC converter further comprises a series resonant circuit 5 serially connected to a secondary side, namely, a secondary coil, of the transformer 4, a full wave rectifier circuit 6 of a bridge type, and a smoothing circuit 7 of a capacitor input type. The series resonant circuit 5 comprises a first inductor 5-1 and a second capacitor 5-2 serially connected to the first inductor 5-1. The full wave rectifier circuit 6 is for rectifying an output of the series resonant circuit 5 and comprises first through fourth diodes 6-1, 6-2, 6-3, and 6-4. The smoothing circuit 7 is for smoothing an output of the full wave rectifier circuit 6 to produce a d.c. output voltage Vout and comprises a capacitor 7-1 and a load resistor 7-2. A switching pulse generation circuit 8 is for generating the first and the second switching pulses Vg1 and Vg2 in response to the d.c. output voltage Vout.

In the example being illustrated, each of the main and the auxiliary switching elements 3 and 2-2 is implemented by an nMOSFET having an integrated body diode. This is applied to all embodiments which will be described later.

Next, the description will be made with regard to operation of the resonant DC-DC converter. As a result of the switching operation, the main and the auxiliary switching elements 3 and 2-2 are put into the on state with the main and the auxiliary switching elements 3 and 2-2 having a dead time. Soft switching operation is carried out during each dead time of the main and the auxiliary switching elements 3 and 2-2. In the soft switching operation, an output capacitor of each switching element is charged and discharged by an magnetizing current of primary side of the transformer 4 through the integrated body diode. In this event, a third equation (3) is led from voltage time product balance of an inductor in the primary side of the transformer 4 by using a terminal voltage Vc of the first capacitor 2-1 and a duty ratio D.

$$VinD = Vc(1-D) \tag{3}$$

Accordingly, the terminal voltage Vc is represented by a fourth equation (4).

$$Vc = \frac{D}{1-D} Vin. \tag{4}$$

As a result, a terminal voltage Vds1 of the main switching element 3 is represented by a fifth equation (5).

$$Vds1 = Vin + Vc = Vin/(1-D). \tag{5}$$

From the fifth equation (5), it can be understood that a waveform of the terminal voltage Vds1 becomes a quasi-square wave having an amplitude voltage of Vin/(1−D) as shown in FIG. 6.

If the waveform of the terminal voltage Vds1 is applied to Fourier expansion by the use of the duty ratio D, it is represented by a sixth equation (6) given by:

$$Vds1 = \frac{Vi8n}{1-D} \left\{ D + \frac{2}{\pi} \left( \sin D\pi \cos x + \frac{1}{2} \sin 2D\pi \cos 2x - \frac{1}{3} \sin 3D \right] 90 \cos 3x + \ldots \right) \right\}. \tag{6}$$

In this event, if attention is directed to a first term of an a.c. component by the same reason mentioned in conjunction with the second equation (2), an amplitude |Vds1ac| thereof is represented by a seventh equation (7) given by:

$$|Vsd1ac| = \frac{Vin}{(1-D)} \frac{2}{\pi} \sin D\pi. \tag{7}$$

Figure 4:
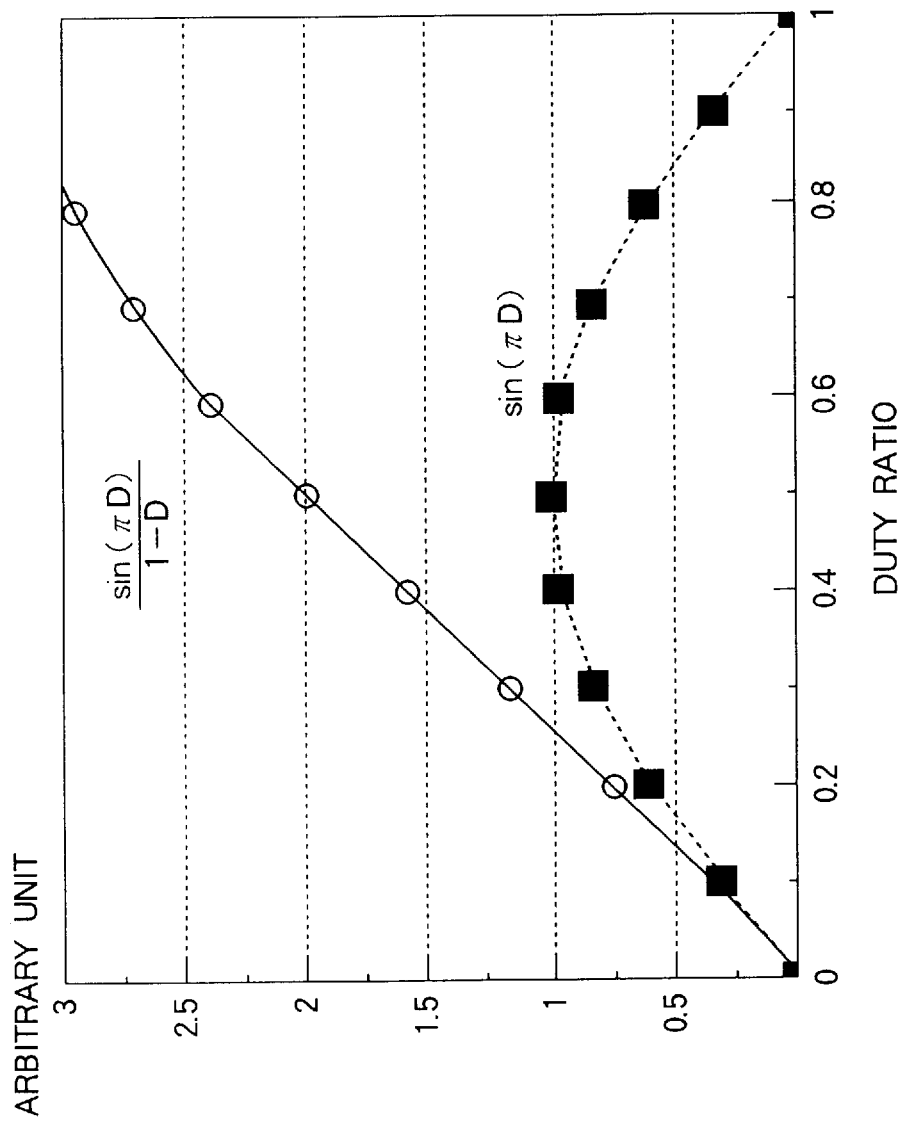
FIG. 4 shows duty ratio characteristic of a resonant DC-DC converter according to this invention and the resonant DC-DC converter illustrated in FIG. 1.

According to the seventh equation (7), the amplitude 51 |Vds1ac| varies linearly to the variation of the duty ratio D when the duty ratio D is in a range of 0.2–0.8 that is a practical variable range. This fact is illustrated in FIG. 4 by a real line.

For the reason mentioned above, the resonant DC-DC converter according to this invention can be controlled by the PWM control at a constant frequency.

The terminal voltage Vds1 is converted by the transformer 4 into an a.c. voltage Vs. The a.c. voltage Vs is supplied to the full wave rectifier circuit 6 through the series resonant circuit 5 and rectified into a rectified voltage. The smoothing circuit 7 smooths the rectified voltage and delivers a smoothed voltage as the d.c. output voltage Vout. In addition, a current Ir flowing through the series resonant circuit 5 is a fundamental wave, namely, a sine wave as illustrated in FIG. 6.

Figure 7:
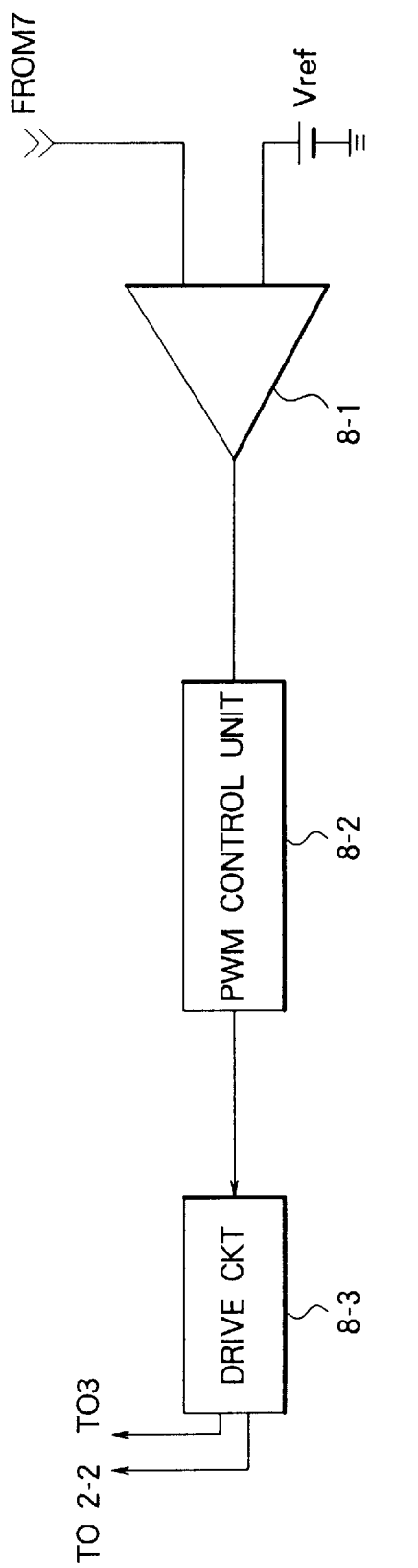
FIG. 7 shows a circuit diagram of a first example of a switching pulse generation circuit illustrated in FIG. 5.

Referring to FIG. 7, the description will proceed to a first example of the switching pulse generation circuit 8. The first example is of a type where the control is carried out by the PWM control only. In this case, the switching pulse generation circuit 8 comprises an error amplifier 8-1, a PWM control unit 8-2, and a drive circuit 8-3. The error amplifier 8-1 is supplied with a reference voltage Vref and supplied with the d.c. output voltage Vout from the smoothing circuit 7. The error amplifier 8-1 amplifies a difference between the reference voltage Vref and the d.c. output voltage Vout and produces an amplified error voltage. The PWM control unit 8-2 modulates the duty ratio D in response to the amplified error voltage and delivers a duty ratio modulated signal having a modulated duty ratio to the drive circuit 8-3. The drive circuit 8-3 generates first and second pulses which have a constant frequency and which have a pulse width corresponding to the modulated duty ratio. The drive circuit 8-3 supplies the first and the second pulses to the main and the auxiliary switching elements 3 and 2-2 as the first and the second switching pulses Vg1 and Vg2, respectively.

Such a first example is suitable for a case that input fluctuation and load fluctuation are not so large.

Figure 8:
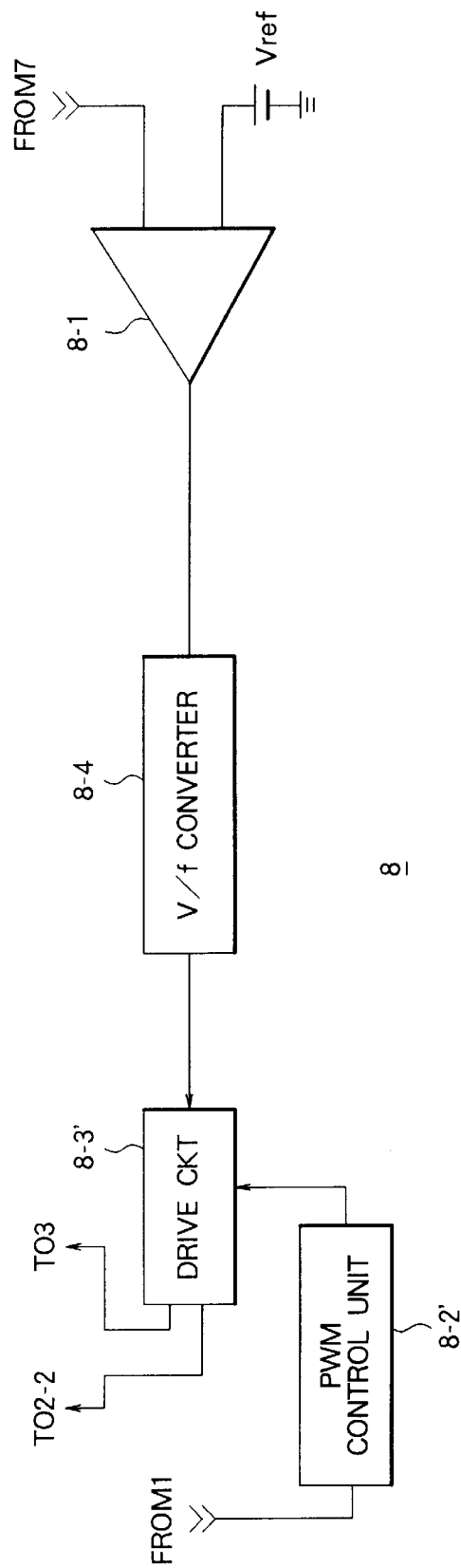
FIG. 8 shows a circuit diagram of a second example of the switching pulse generation circuit illustrated in FIG. 5.

Referring to FIG. 8, the description will proceed to a second example of the switching pulse generation circuit 8. The second example is a type that the control is carried out by the PWM control together with frequency control. In this event, the switching pulse generation circuit 8 comprises the error amplifier 8-1, a PWM control unit 8-2', a drive circuit 8-3', and a V/f (voltage/frequency) converter 8-4. As mentioned before, the error amplifier 8-1 produces the amplified error voltage. The V/f converter 8-4 converts the amplified error voltage into a variable frequency signal having a frequency which varies with the amplified error voltage.

The PWM control unit 8-2' modulates the duty ratio D in response to the input voltage Vin and delivers a duty ratio modulated signal having a modulated duty ratio to the drive circuit 8-3'. The drive circuit 8-3' generates first and second pulses which have a frequency corresponding to the frequency of the variable frequency signal and which have a pulse width corresponding to the modulated duty ratio. The drive circuit 8-3' supplies the first and the second pulses to the main and the auxiliary switching elements 3 and 2-2 as the first and the second switching pulses Vg1 and Vg2, respectively.

Such a second example is suitable for a case that it has large input fluctuation and large load fluctuation. Namely, the frequency control is utilized for load fluctuation while the PWM control is utilized for input fluctuation.

Both the first and the second examples are applied to all embodiments which will be described later.

Figure 9:
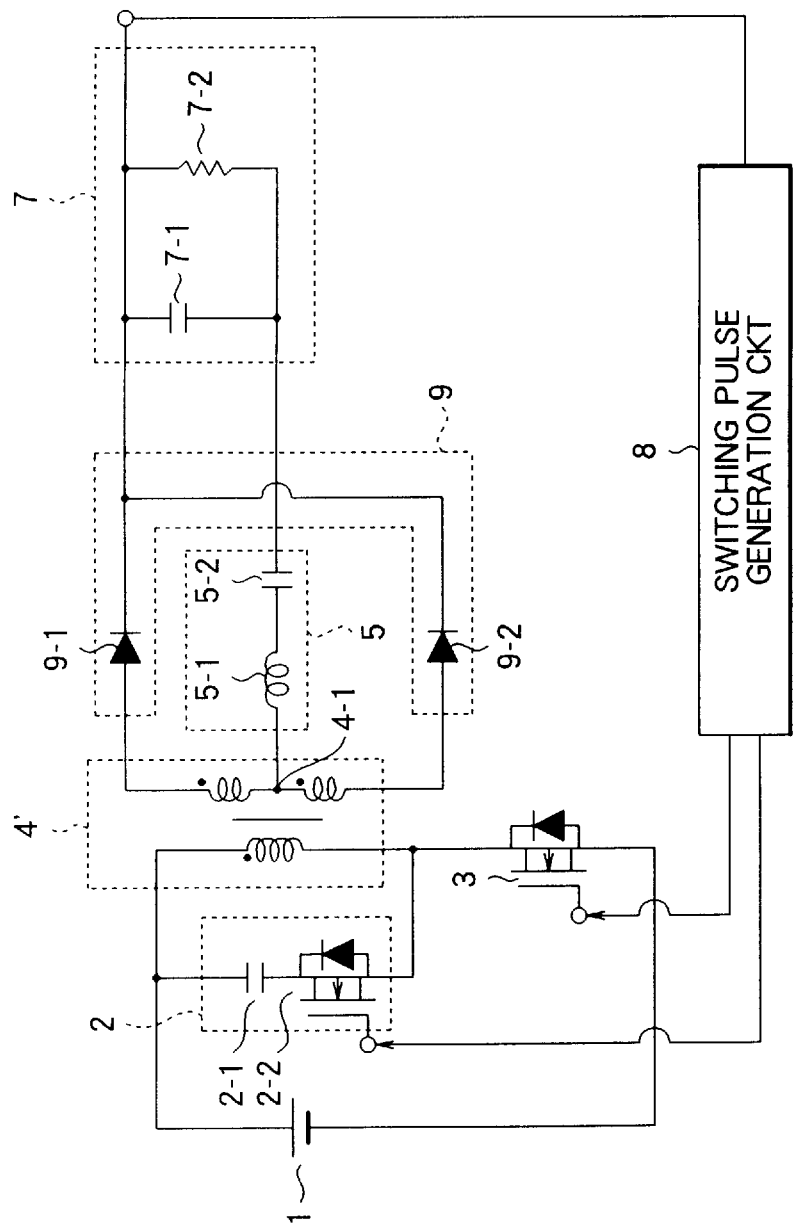
FIG. 9 shows a circuit diagram of a resonant DC-DC converter according to a second embodiment of this invention.

Referring to FIG. 9, the description will be made with regard to a resonant DC-DC converter according to a second embodiment of this invention. The resonant DC-DC converter is similar to that illustrated in FIG. 5 except that a transformer 4' is a type having a center tap 4-1 and that the series resonant circuit 5 is connected to the center tap 4-1. Furthermore, a full wave rectifier circuit 9 comprising first and second diodes 9-1 and 9-2 is used in place of the full wave rectifier circuit 6 shown in FIG. 5.

In the second embodiment, the full wave rectifier circuit 9 rectifies an output of the series resonant circuit 5 and supplies the rectified voltage to the smoothing circuit 7. Operation of remaining parts is similar to that described in conjunction with FIGS. 5 and 6.

Figure 10:
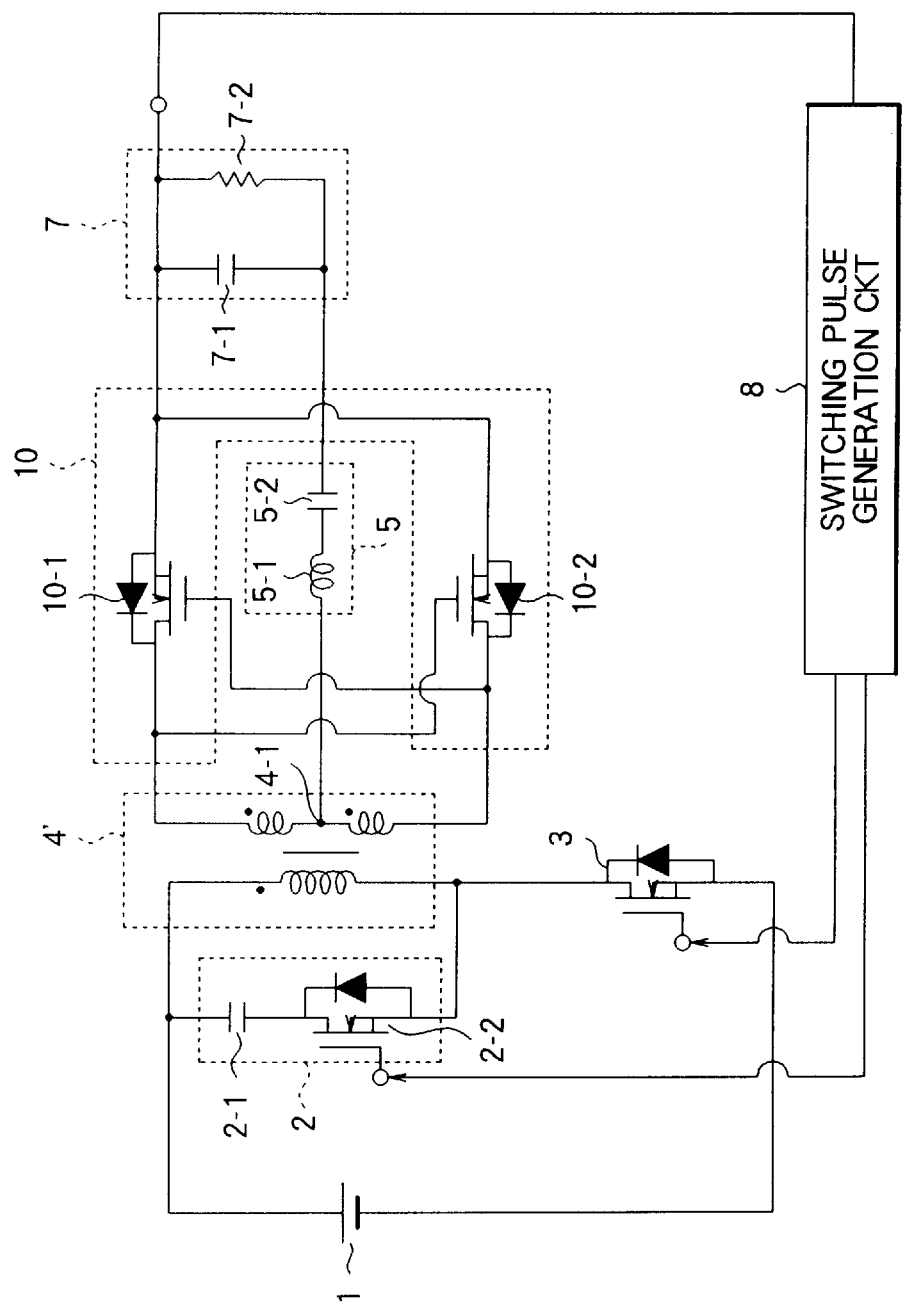
FIG. 10 shows a circuit diagram of a resonant DC-DC converter according to a third embodiment of this invention.

Referring to FIG. 10, the description will proceed to a resonant DC-DC converter according to a third embodiment of this invention. The resonant DC-DC converter is similar to that illustrated in FIG. 9 except that a synchronous rectifier circuit 10 is used in place of the full wave rectifier circuit 9. The synchronous rectifier circuit 10 comprises first and second nMOSFETs 10-1 and 10-2. Namely, each of the first and the second nMOSFETs 10-1 and 10-2 has an integrated body diode. Operation is similar to that illustrated in FIG. 9.

Figure 11:
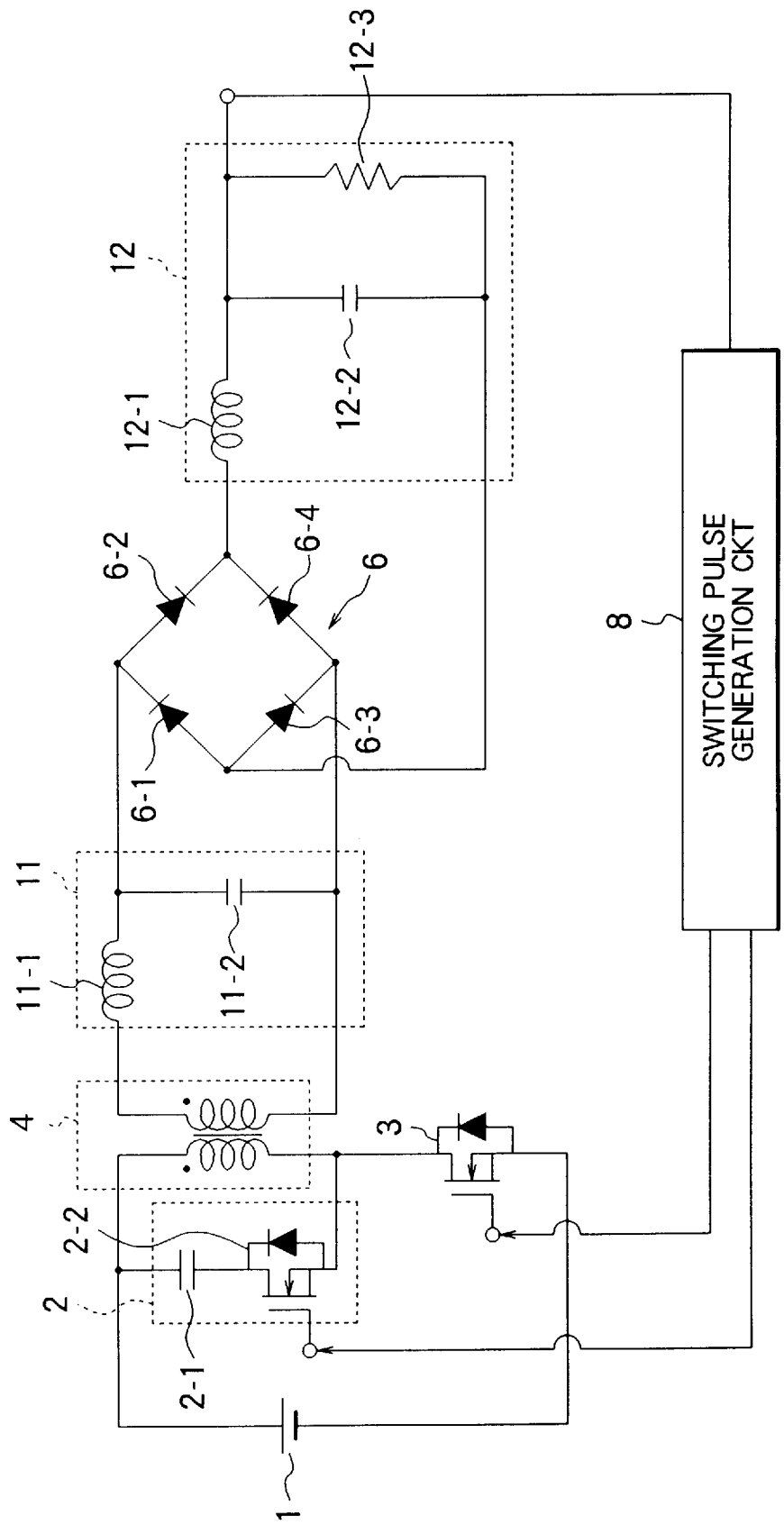
FIG. 11 shows a circuit diagram of a resonant DC-DC converter according to a fourth embodiment of this invention.

Referring to FIG. 11, the description will be made with regard to a resonant DC-DC converter according to a fourth embodiment of this invention. The resonant DC-DC converter is similar to that illustrated in FIG. 5 except that a parallel resonant circuit 11 is used in place of the series resonant circuit 5 and that a smoothing circuit 12 of a choke input type is used in place of the smoothing circuit 7. The parallel resonant circuit 11 comprises a first inductor 11-1 and a second capacitor 11-2. The smoothing circuit 12 comprises a choke coil 12-1, a capacitor 12-2, and a load resistor 12-3.

In the fourth embodiment, the full wave rectifier circuit 6 rectifies an output of the parallel resonant circuit 11 and supplies the rectified voltage to the smoothing circuit 12. The smoothing circuit 12 smooths the rectified voltage and produces a smoothed voltage as the d.c. output voltage Vout. Operation of remaining parts is similar to that described in conjunction with FIGS. 5 and 6.

Figure 12:
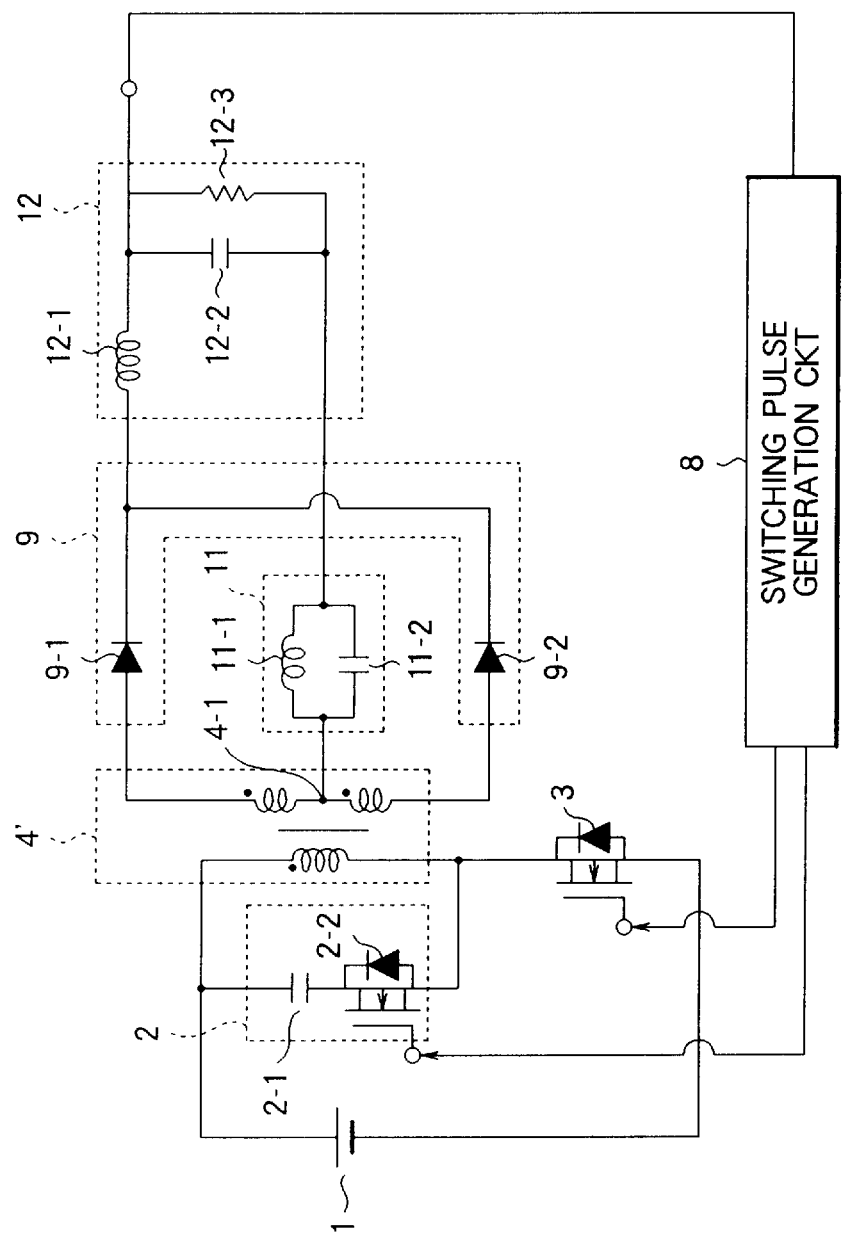
FIG. 12 shows a circuit diagram of a resonant DC-DC converter according to a fifth embodiment of this invention.

Referring to FIG. 12, the description will proceed to a resonant DC-DC converter according to a fifth embodiment of this invention. The resonant DC-DC converter is similar to that illustrated in FIG. 9 except that the parallel resonant circuit 11 mentioned in FIG. 11 is used in place of the series resonant circuit 5 and that the smoothing circuit 12 described in FIG. 11 is used in place of the smoothing circuit 7 of the capacitor input type. Operation of the resonant DC-DC converter is similar to that described in conjunction with FIGS. 5 and 6.

Figure 13:
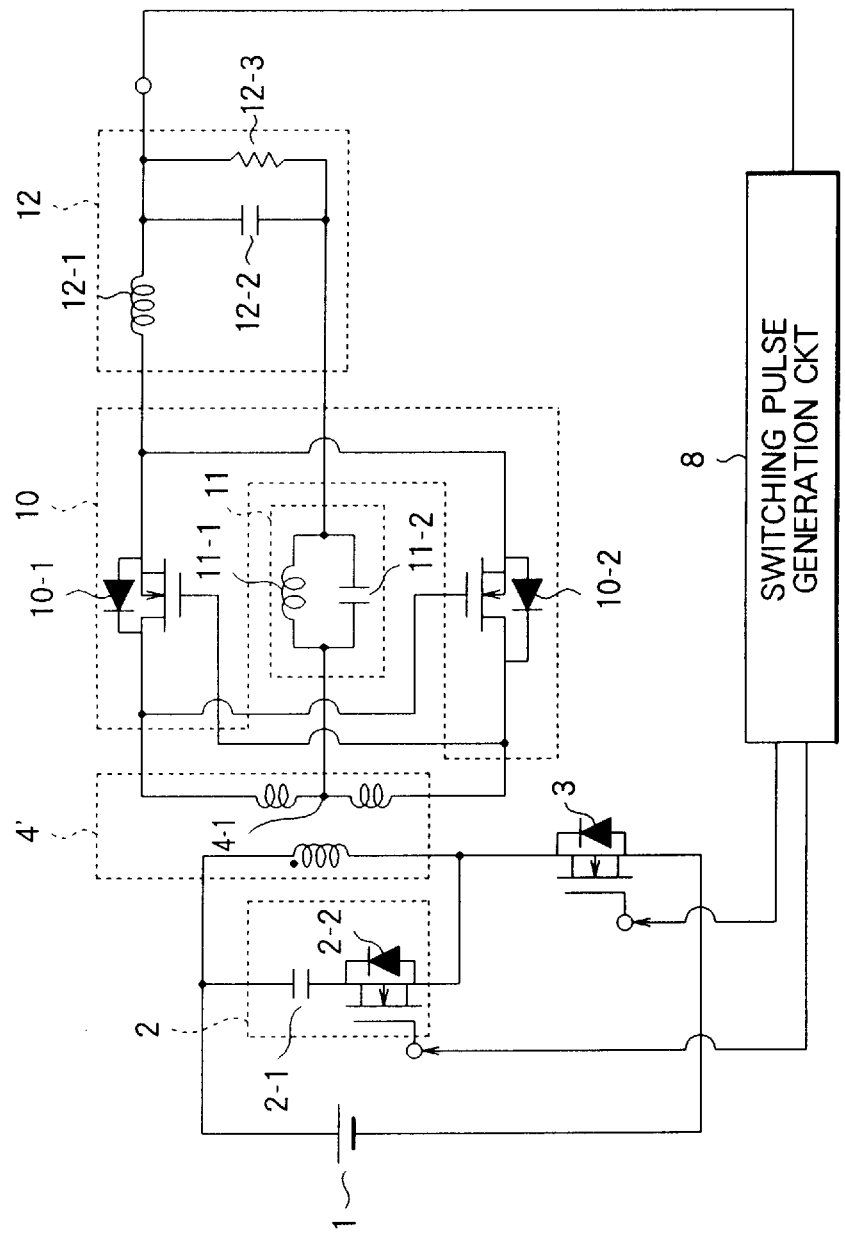
FIG. 13 shows a circuit diagram of a resonant DC-DC converter according to a sixth embodiment of this invention.

Referring to FIG. 13, a resonant DC-DC converter according to a sixth embodiment of this invention is similar to that illustrated in FIG. 10 except that the parallel resonant circuit 11 mentioned in FIG. 11 is used in place of the series resonant circuit 5 and that the smoothing circuit 12 described in FIG. 11 is used in place of the smoothing circuit 7 of the capacitor input type. Operation of the resonant DC-DC converter is similar to that described in conjunction with FIGS. 5 and 6.

Figure 14:
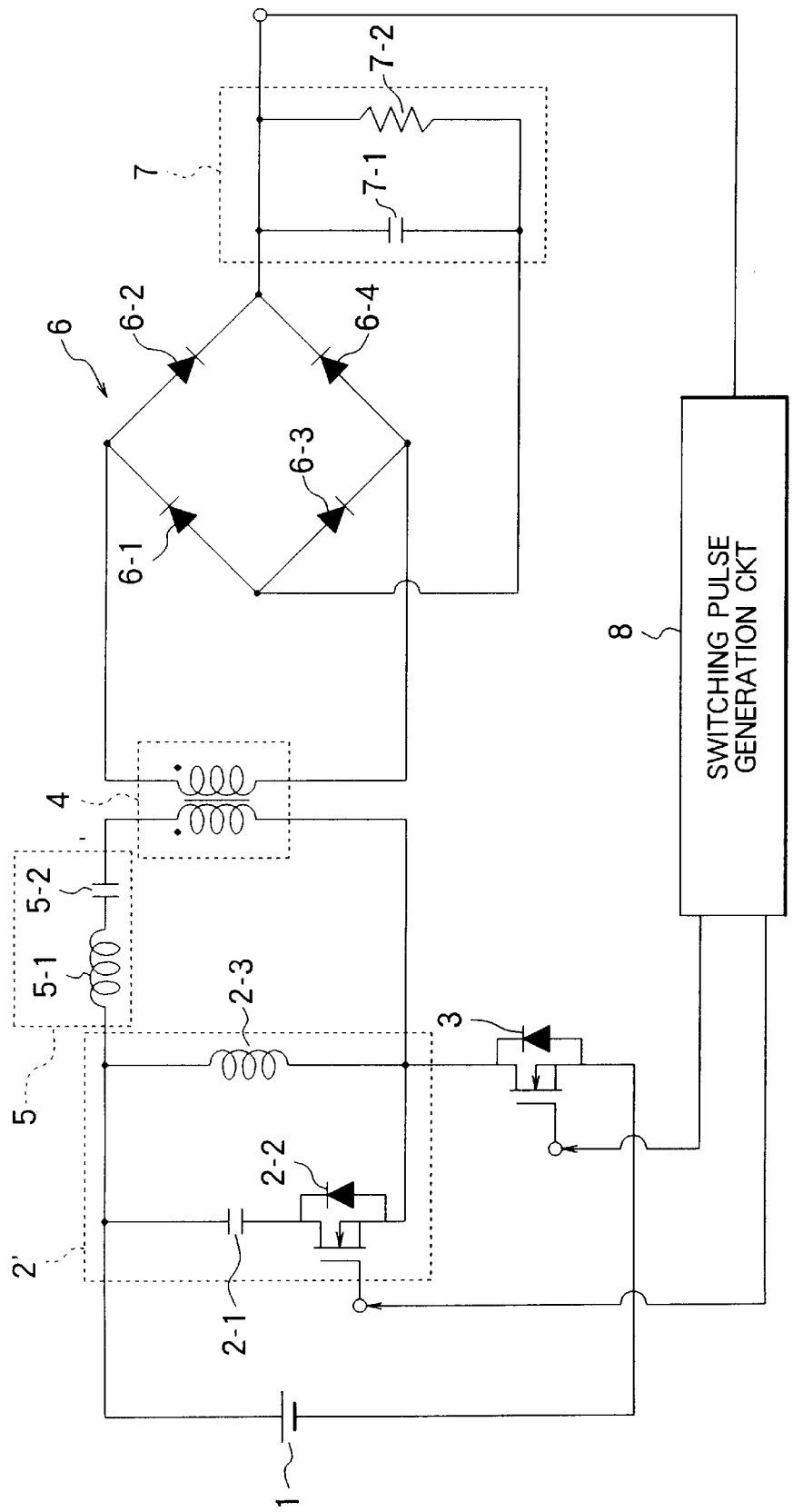
FIG. 14 shows a circuit diagram of a resonant DC-DC converter according to a seventh embodiment of this invention.

Referring to FIG. 14, a resonant DC-DC converter according to a seventh embodiment of this invention is similar to that illustrated in FIG. 5 except that a clamp circuit 2' is used in place of the clamp circuit 2 and that the series resonant circuit 5 is removed from the secondary side of the transformer 4 and is connected between the clamp circuit 2' and the primary side of the transformer 4. The clamp circuit 2' comprises the first capacitor 2-1, the auxiliary switching element 2-2, and a third inductor 2-3 which is connected in parallel to the first capacitor 2-1 and the auxiliary switching element 2-2. Operation of the resonant DC-DC converter is similar to that described in relation to FIGS. 5 and 6.

Figure 15:
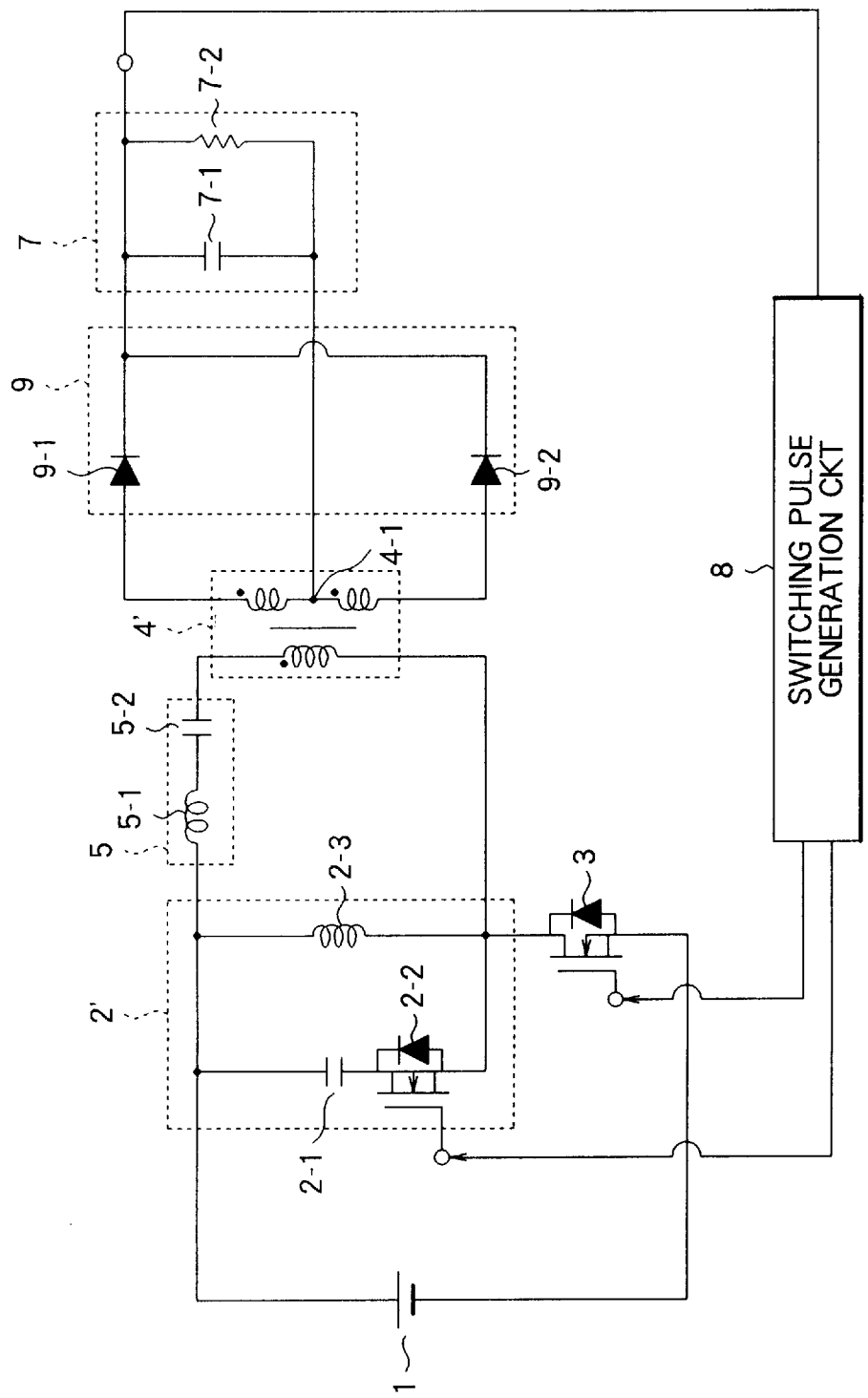
FIG. 15 shows a circuit diagram of a resonant DC-DC converter according to an eighth embodiment of this invention.

Referring to FIG. 15, a resonant DC-DC converter according to an eighth embodiment of this invention is similar to that illustrated in FIG. 14 except that the transformer 4' having the center tap 4-1 is used in place of the transformer 4 and that the full wave rectifier circuit 9 is used in place of the full wave rectifier circuit 6. Operation of the resonant DC-DC converter is similar to that described in conjunction with FIGS. 5 and 6.

Figure 16:
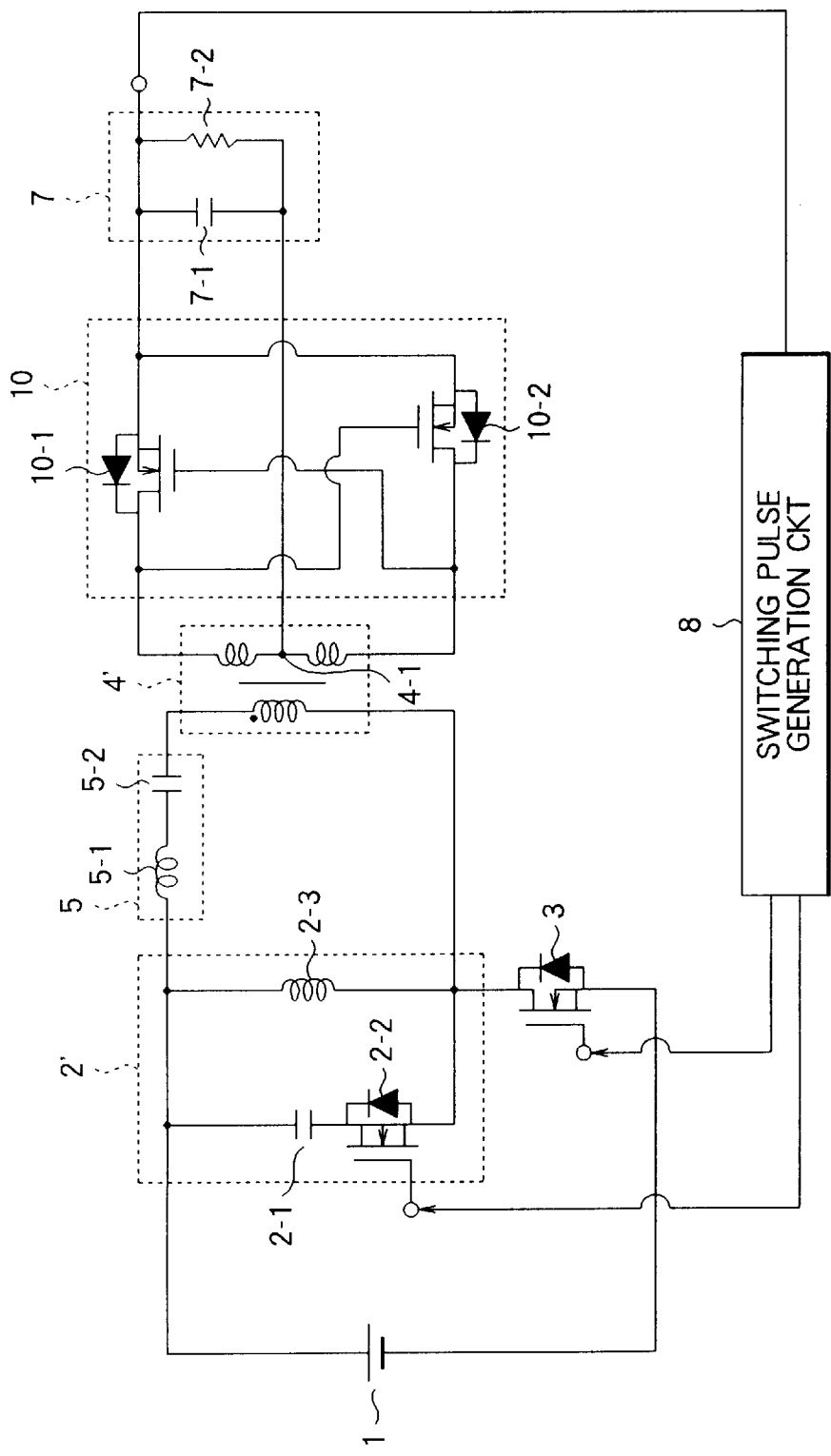
FIG. 16 shows a circuit diagram of a resonant DC-DC converter according to a ninth embodiment of this invention.

Referring to FIG. 16, a resonant DC-DC converter according to a ninth embodiment of this invention is similar to that illustrated in FIG. 14 except that the synchronous rectifier circuit 10 is used in place the full wave rectifier circuit 9. Operation of the resonant DC-DC converter is similar to that described in conjunction with FIGS. 5 and 6.

Figure 17:
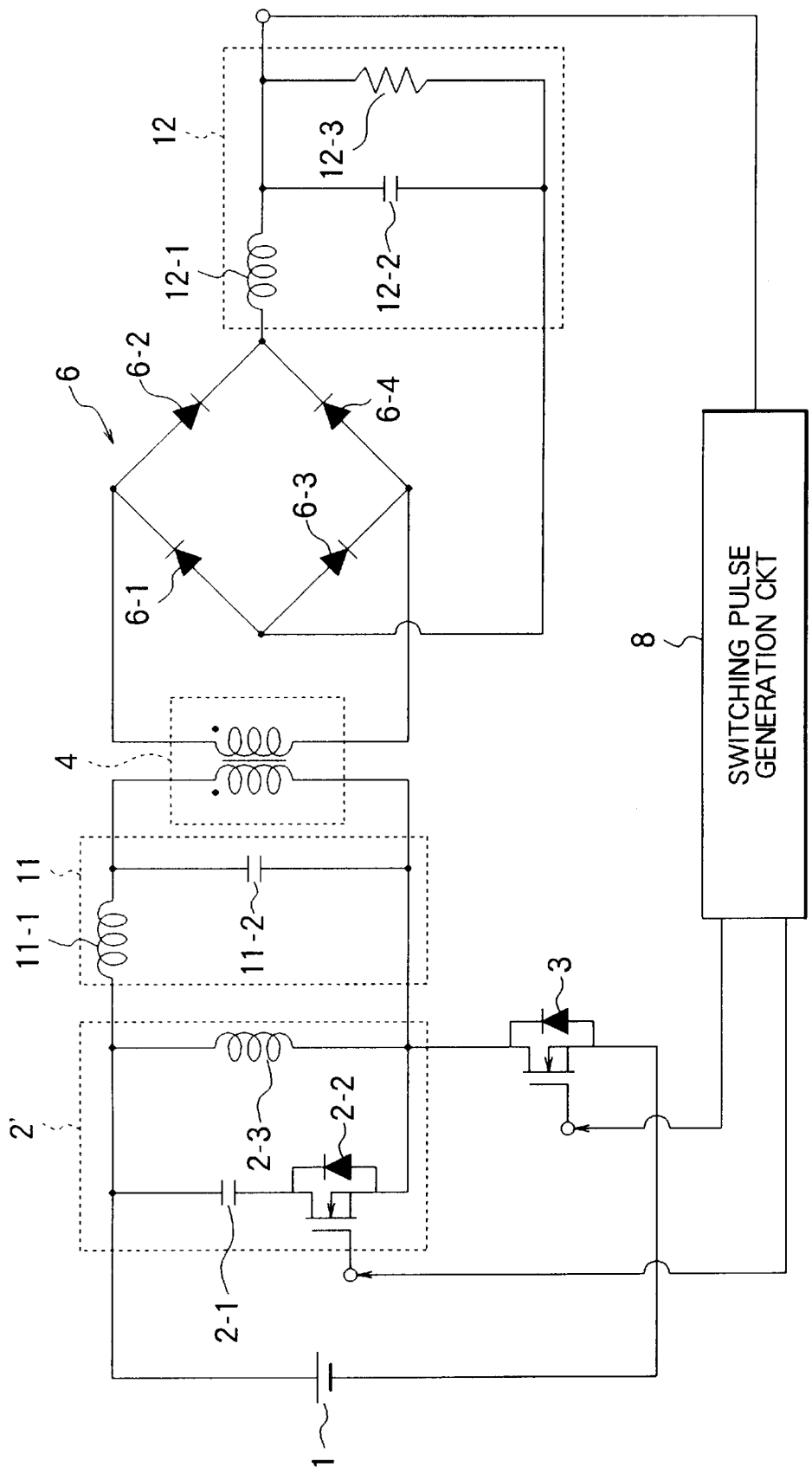
FIG. 17 shows a circuit diagram of a resonant DC-DC converter according to a tenth embodiment of this invention.

Referring to FIG. 17, a resonant DC-DC converter according to a tenth embodiment of this invention is similar to that illustrated in FIG. 14 except that the parallel resonant circuit 11 is used in place of the series resonant circuit 5 and that the smoothing circuit 12 of the choke input type is used in place of the smoothing circuit 7 of the capacitor input type. Operation of the resonant DC-DC converter is similar to that described in conjunction with FIGS. 5 and 6.

Figure 18:
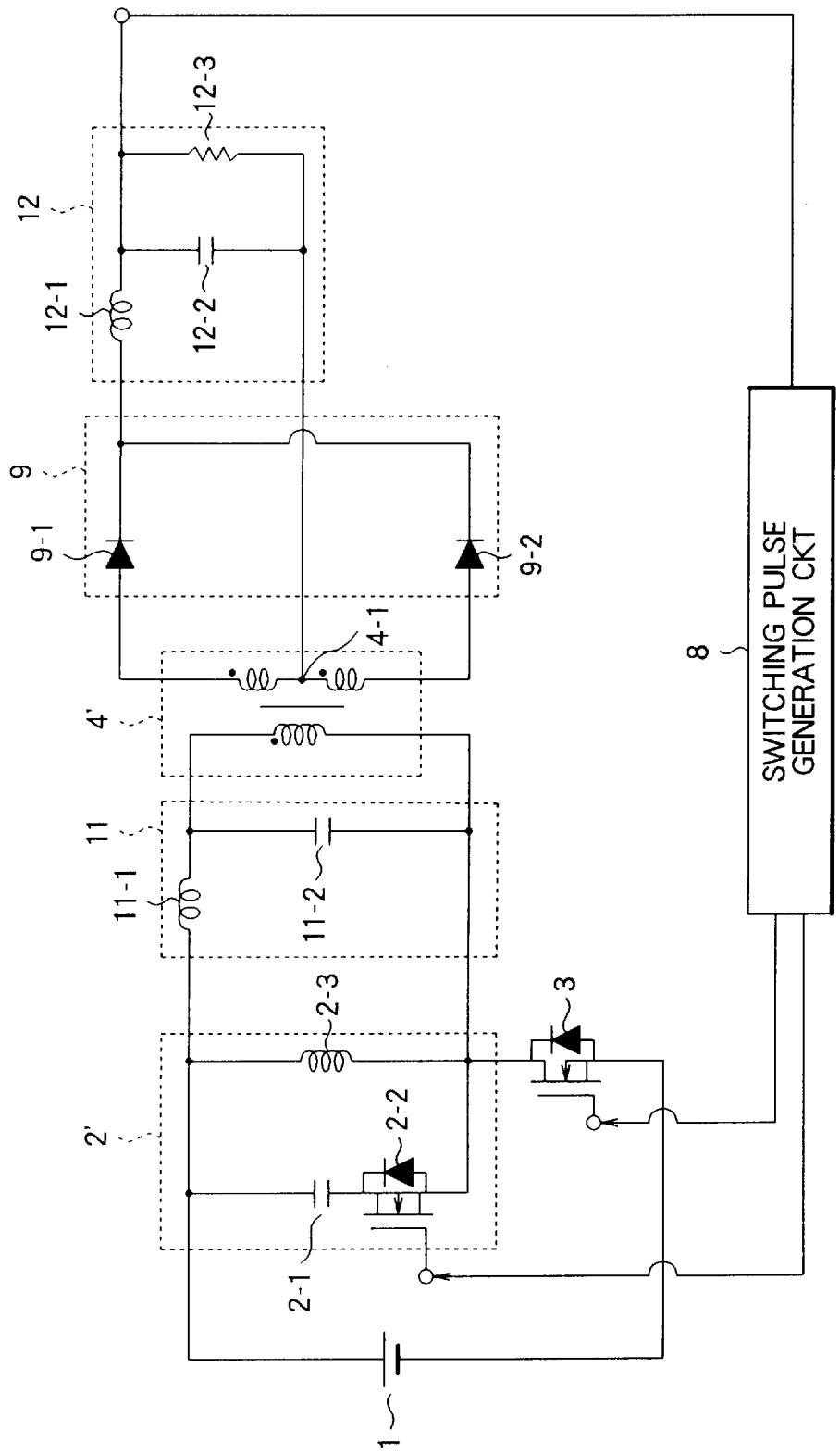
FIG. 18 shows a circuit diagram of a resonant DC-DC converter according to an eleventh embodiment of this invention.

Referring to FIG. 18, a resonant DC-DC converter according to an eleventh embodiment of this invention is similar to that illustrated in FIG. 15 except that the parallel resonant circuit 11 is used in place of the series resonant circuit 5 and that the smoothing circuit 12 of the choke input type is used in place of the smoothing circuit 7 of the capacitor input type. Operation of the resonant DC-DC converter is similar to that described in conjunction with FIGS. 5 and 6.

Figure 19:
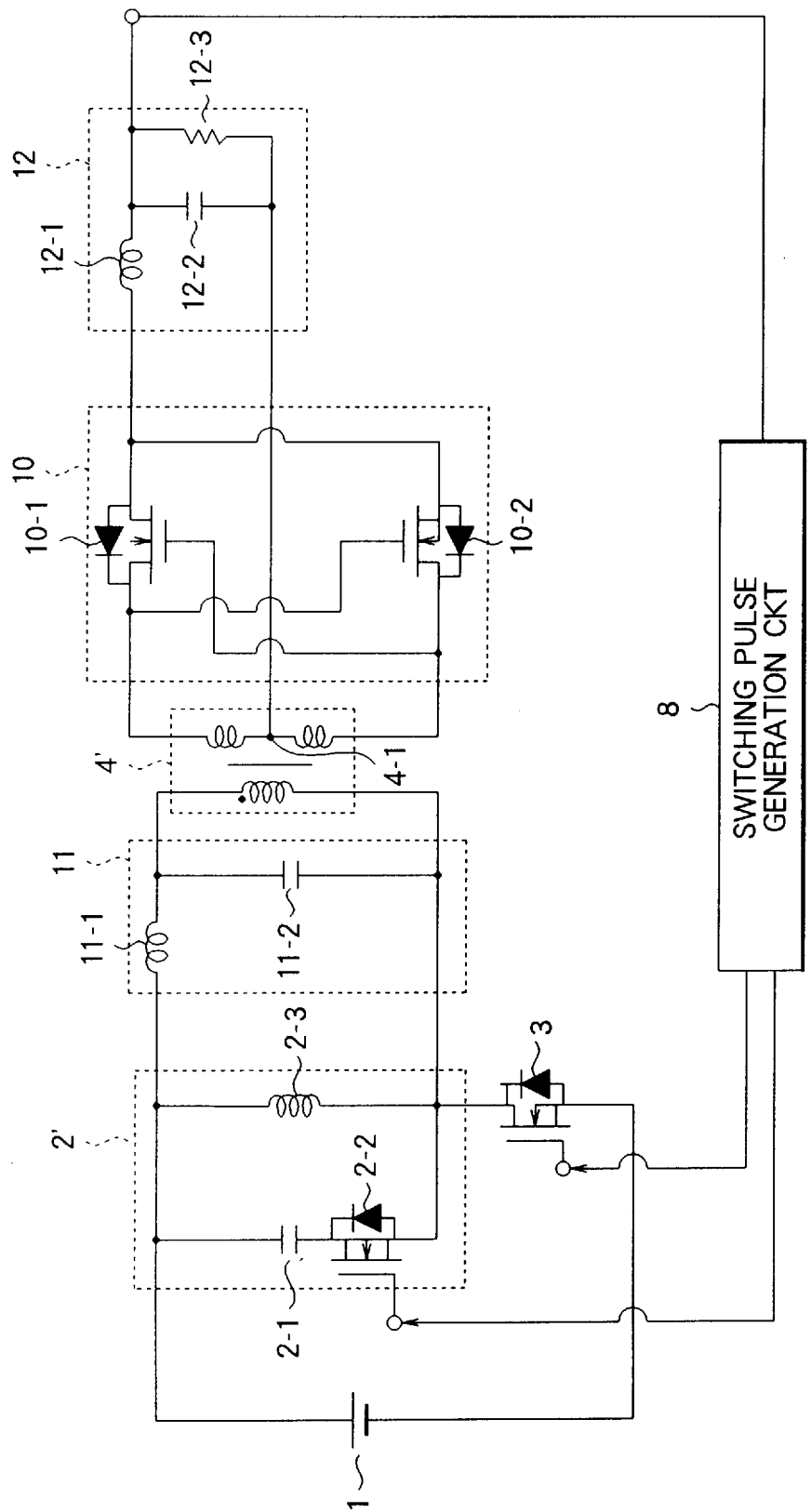
FIG. 19 shows a circuit diagram of a resonant DC-DC converter according to a twelfth embodiment of this invention.

Referring to FIG. 19, a resonant DC-DC converter according to a twelfth embodiment of this invention is similar to that illustrated in FIG. 18 except that the synchronous rectifier circuit 10 is used in place of the full wave rectifier circuit 9. Operation of the resonant DC-DC converter is similar to that described in conjunction with FIGS. 5 and 6.

Figure 20:
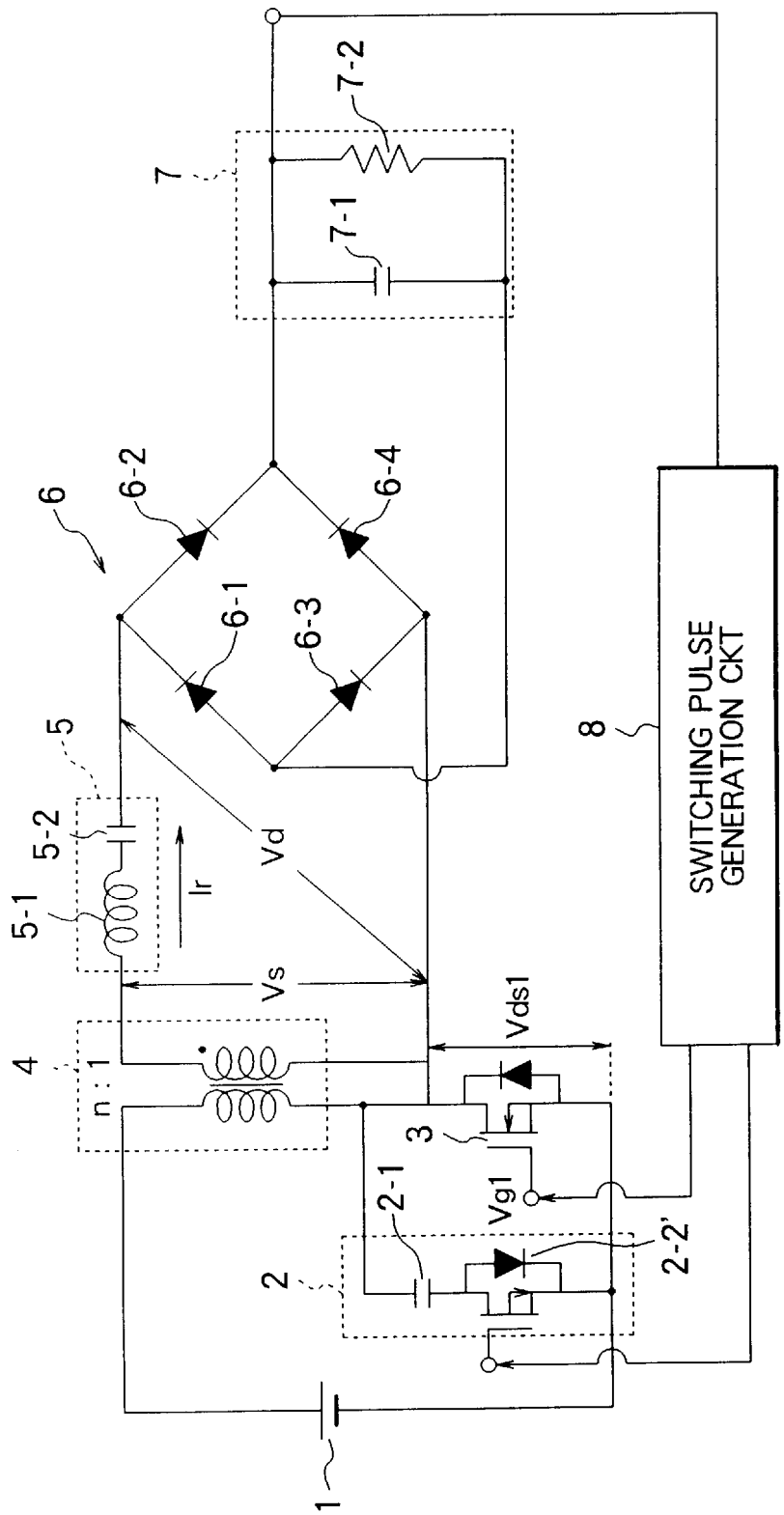
FIG. 20 shows a circuit diagram of a resonant DC-DC converter according to a thirteenth embodiment of this invention.

Referring to FIG. 20, the description will be made with regard to a modification of the resonant DC-DC converter illustrated in FIG. 5. In the modification, an auxiliary switching element 2-2' is used in place of the auxiliary switching element 2-2. The auxiliary switching element 2-2' is implemented by a pMOSFET having an integrated body diode. In this case, the clamp circuit 2-2' is connected in parallel to the main switching element 3. Operation of the resonant DC-DC converter is similar to that described in conjunction with FIGS. 5 and 6. Such a modification can be applied to all embodiments which are described hereinbefore.

Figure 21:
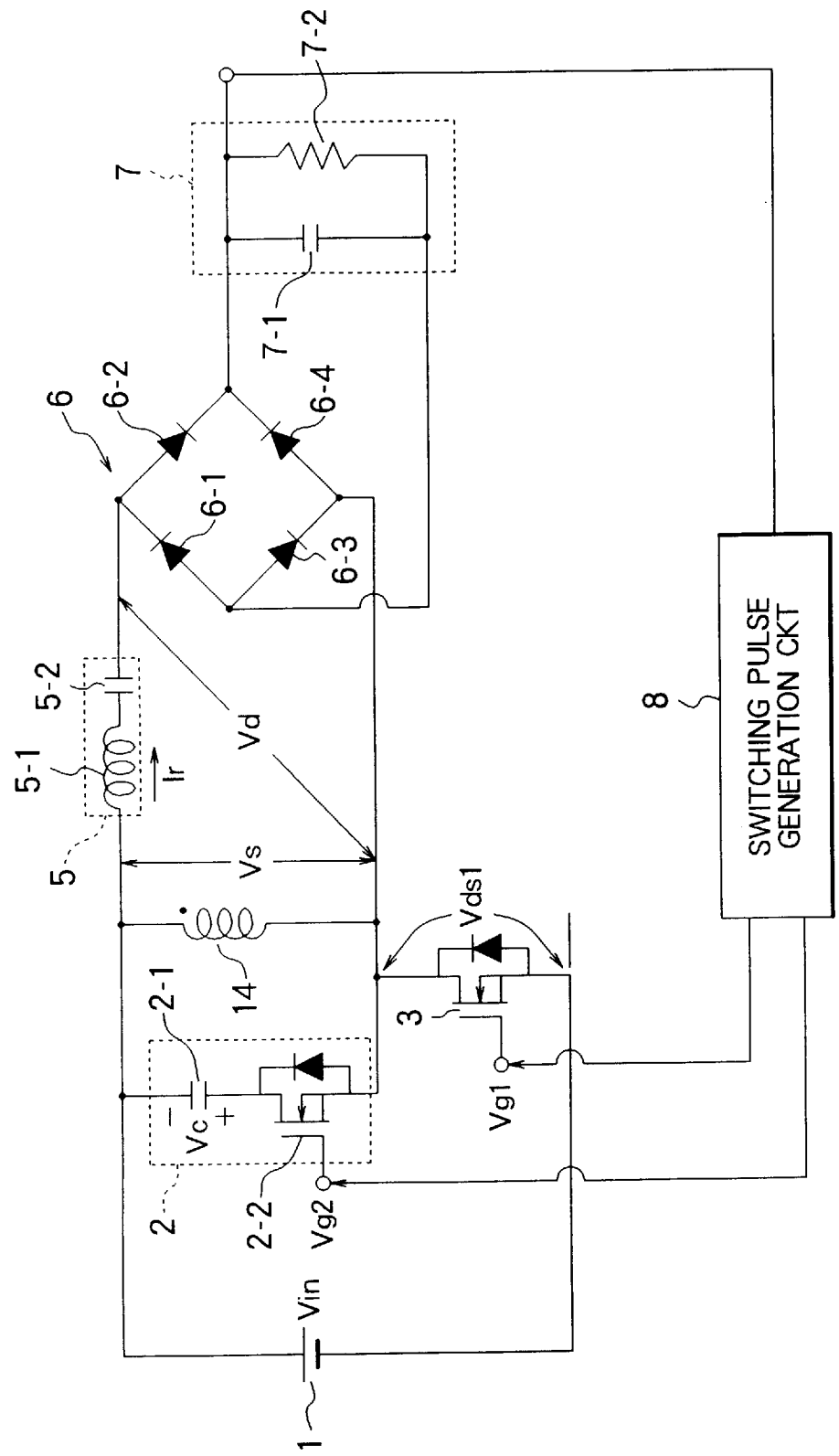
FIG. 21 shows a circuit diagram of a resonant DC-DC converter according to a fourteenth embodiment of this invention.
Figure 22:
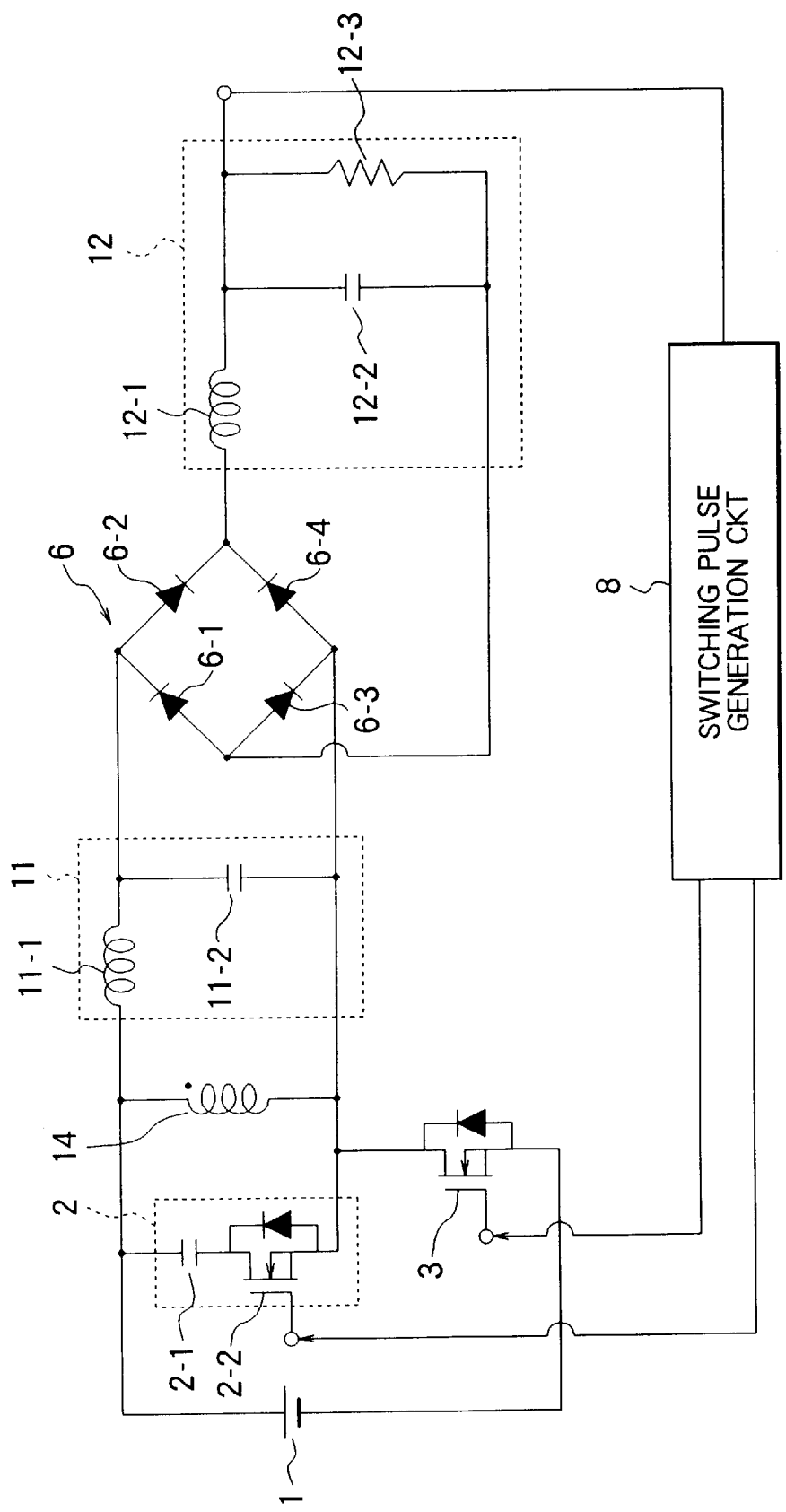
FIG. 22 shows a circuit diagram of a resonant DC-DC converter according to a fifteenth embodiment of this invention.

Referring to FIG. 21, the description will proceed to another modification of the resonant DC-DC converter of the first embodiment illustrated in FIG. 5. In the other modification, an inductor 14 is used in place of the transformer 4. Such the modification can be applied to all embodiments which comprise the transformer 4 having no center tap. For example, a resonant DC-DC converter illustrated in FIG. 22 is a modification of the resonant DC-DC converter of the fourth embodiment illustrated in FIG. 11. In these modifications, the auxiliary switching element 2-2 may be implemented by the pMOSFET.

Figure 23:
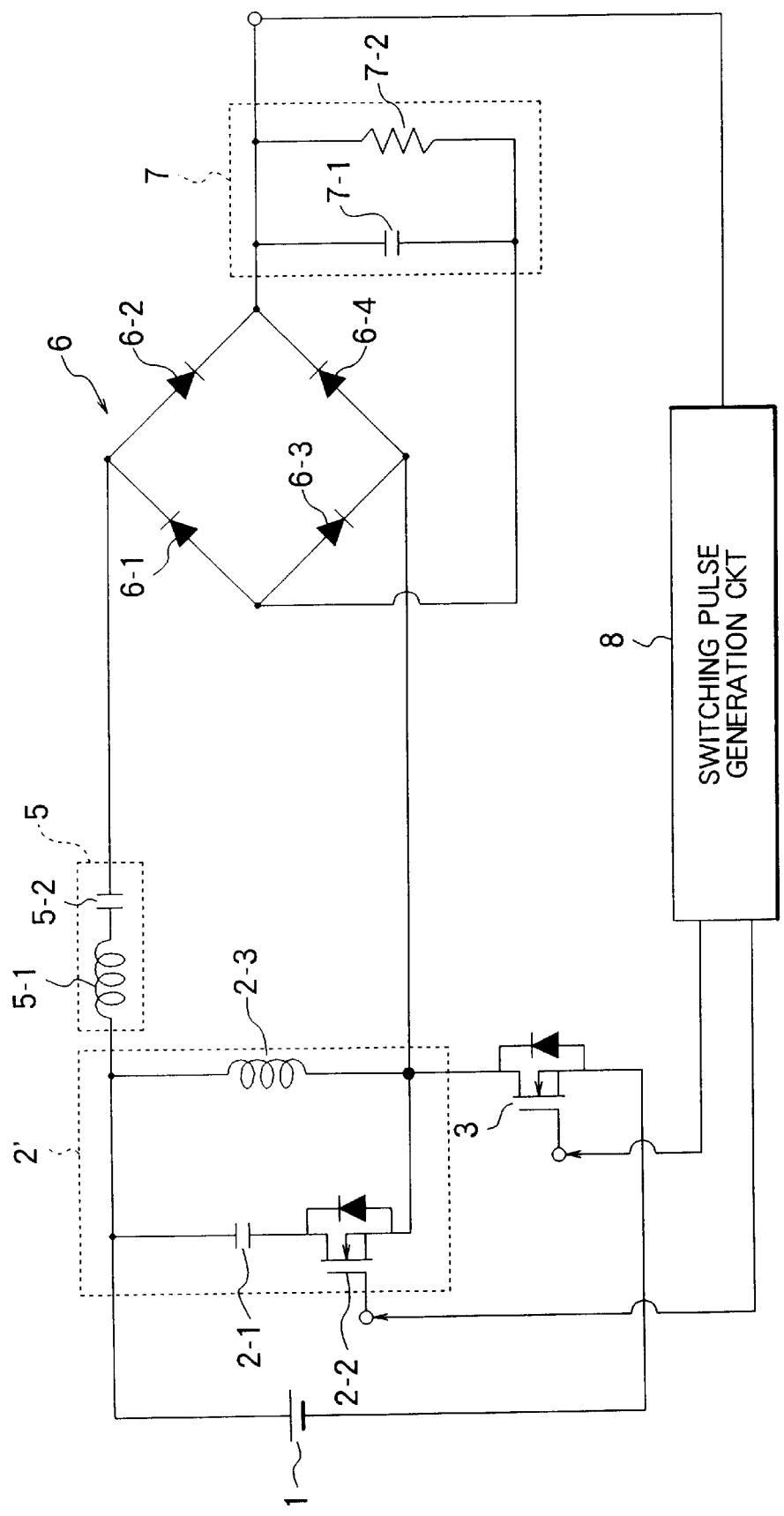
FIG. 23 shows a circuit diagram of a resonant DC-DC converter according to a sixteenth embodiment of this invention.
Figure 24:
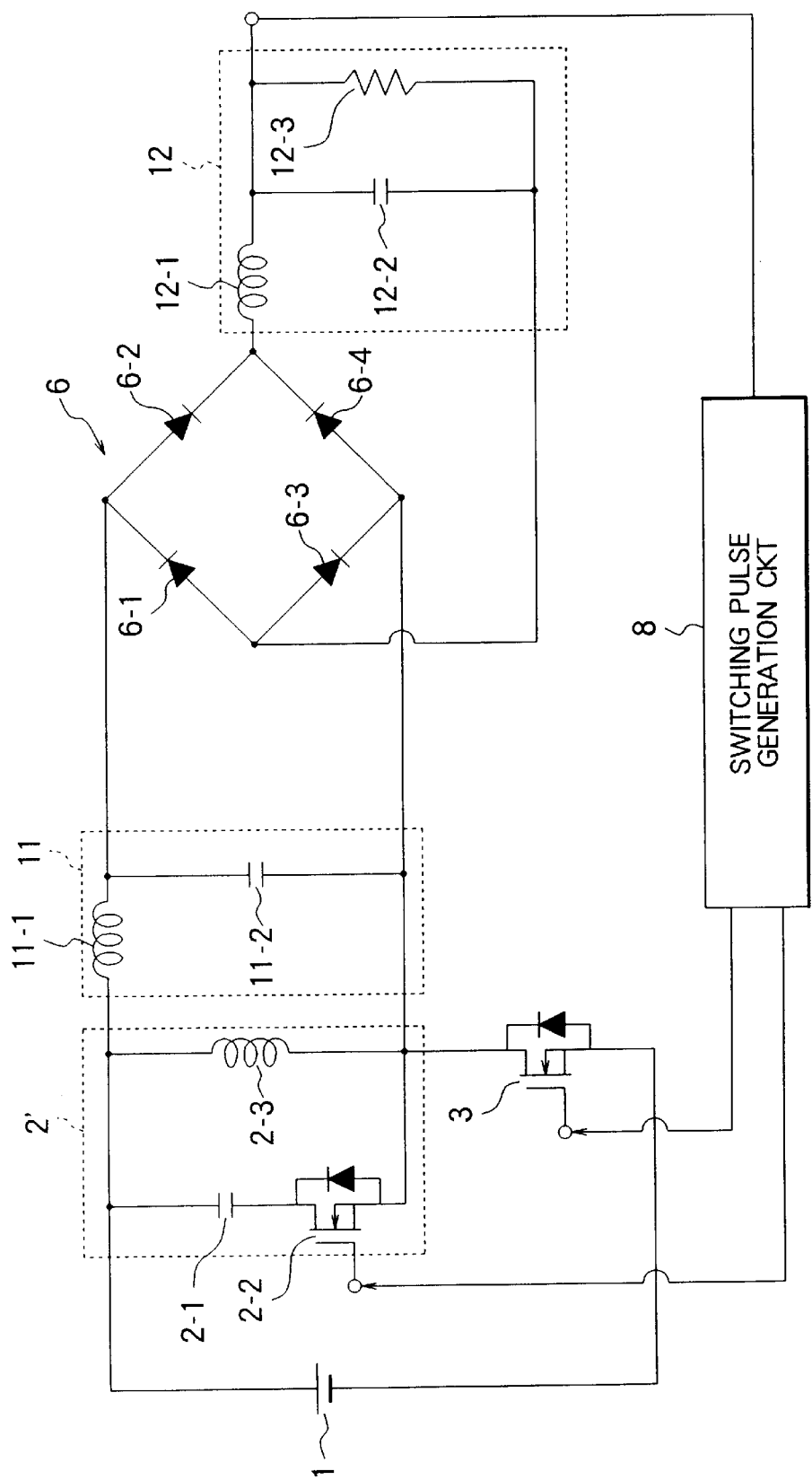
FIG. 24 shows a circuit diagram of a resonant DC-DC converter according to a seventeenth embodiment of this invention.

Referring to FIGS. 23 and 24, further modifications will be described. In the embodiments in which the resonant circuit is connected to the primary side of the transformer, the transformer may be removed. In this case, circuit elements connected to the primary side are directly connected to circuit elements connected to the secondary side. In FIG. 23, the resonant DC-DC converter is the modification of the seventh embodiment illustrated in FIG. 14. In the modification, the clamp circuit 2' and the series resonant circuit 5 are directly connected to the full wave rectifier circuit 6. In FIG. 24, the resonant DC-DC converter is the modification of the tenth embodiment illustrated in FIG. 17. In the modification, the parallel resonant circuit 11 is directly connected to the full wave rectifier circuit 6. In these modifications, the auxiliary switching element 2-2 may be implemented by the pMOSFET.

Figure 25:
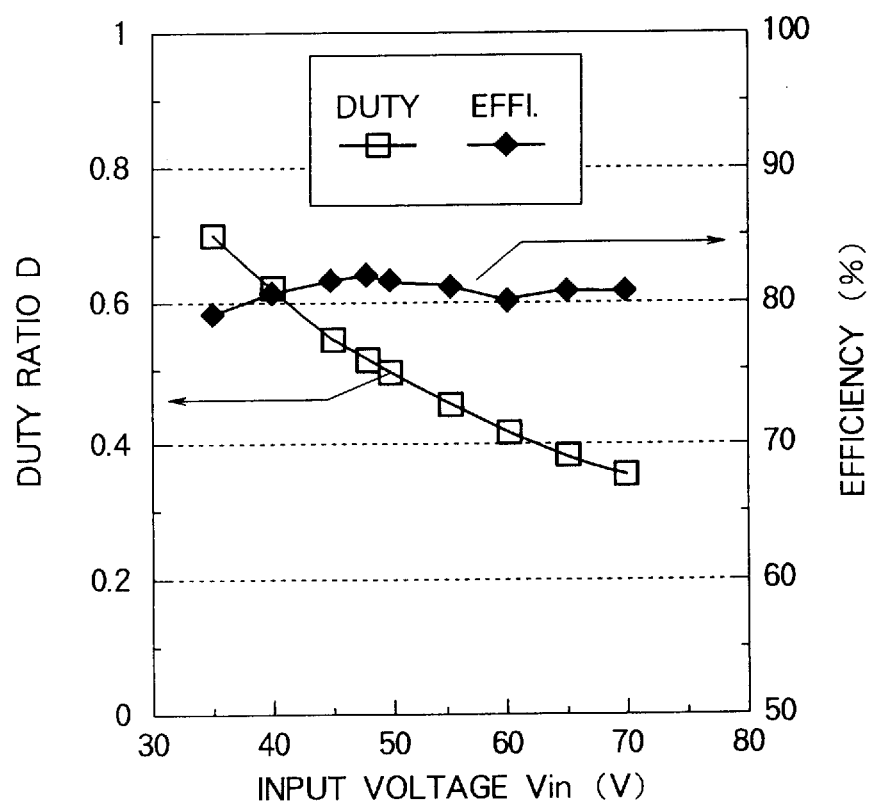
FIG. 25 shows characteristic among an input voltage, a duty ratio, and efficiency in the resonant DC-DC converter illustrated in FIG. 5.
Figure 26:
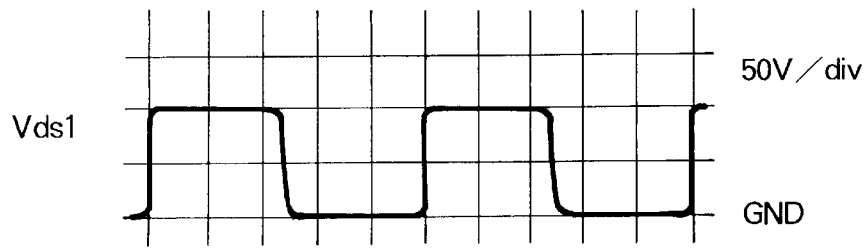
FIG. 26 shows waveforms for use in describing operation of the resonant DC-DC converter illustrated in FIG. 5 under the condition that the input voltage Vin is equal to 48 (V) and that the duty ratio D is equal to 0.5.
Figure 26:
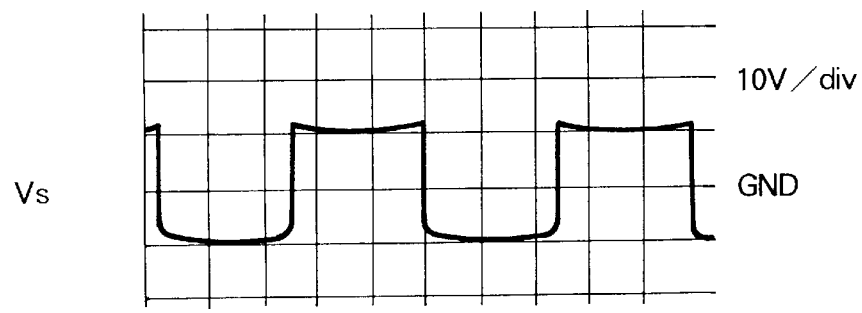
Figure 26:
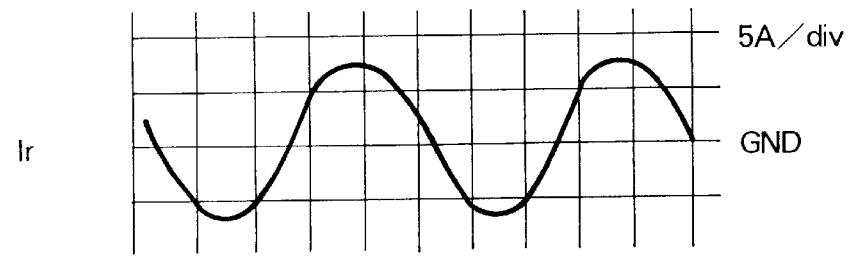
Figure 26:
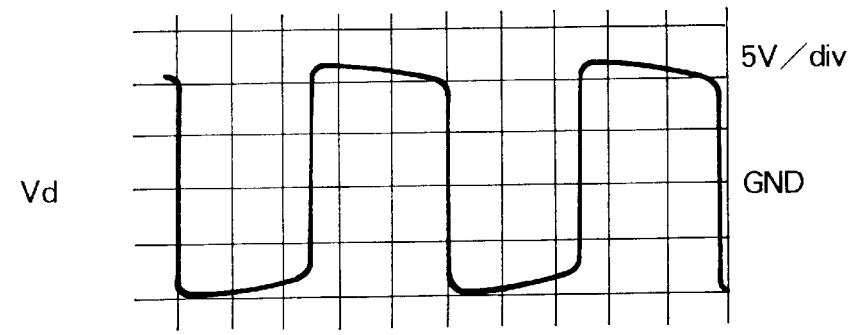
Figure 27:
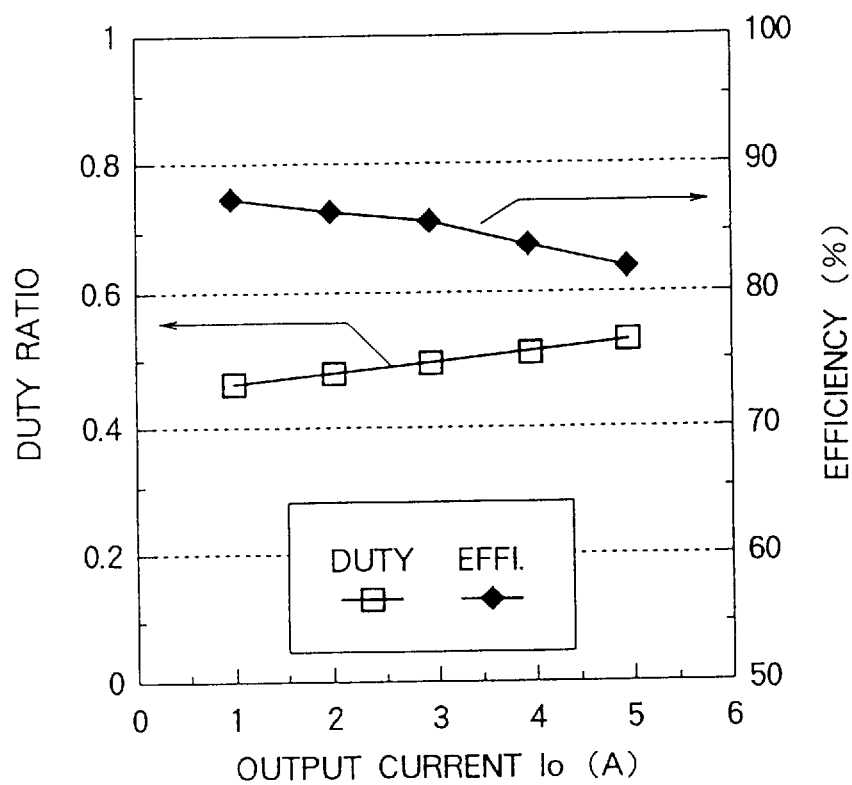
FIG. 27 shows characteristic among an output current, a duty ratio, and efficiency in the resonant DC-DC converter illustrated in FIG. 5.

Referring to FIGS. 25 to 27, the description will be made with regard to a measurement result which is applied to the first embodiment illustrated in FIG. 5. The measurement is carried out under a condition that a switching frequency is constant at 200 (kHz). Moreover, the input voltage Vin varies in a range of 35–70 (V) and the duty ratio D varies so that the d.c. output voltage and the output current become equal to 9 (V) and 5 (A), respectively.

As will become clear from FIG. 25, if the input voltage varies from 35 (V) to 70 (V), the d.c. output voltage can be controlled at a constant by changing the duty ratio D under the condition of a constant switching frequency. It is possible to obtain efficiency of 80 (%) or over.

FIG. 26 shows waveforms of the voltages Vds1, Vs, and Vd and the current Ir which are illustrated in FIG. 5 under a condition that the input voltage Vin is equal to 48 (V), the d.c. output voltage is equal to 9 (V), the output current is equal to 5 (A), and the duty ratio D is equal to 0.5.

FIG. 27 shows a relation between the duty ratio D and the efficiency when the output current varies in a range between 1 and 5 (A) at a constant d.c. output voltage of 9 (V). As apparent from FIG. 27, it is possible to hold the d.c. output voltage at a constant value of 9 (V) without a large change of the duty ratio D, if the load fluctuation occurs.

What is claimed is:

1. A resonant DC-DC converter for converting a d.c. input voltage Vin into a predetermined d.c. output voltage and comprising main switching means for switching said d.c. input voltage under control of switching pulses defined by a duty ratio D to supply an a.c. voltage to a primary side of a transformer, a rectifier circuit connected to a secondary side of said transformer for rectifying an a.c. voltage derived from said secondary side to produce a rectified voltage, and a smoothing circuit connected to said rectifier circuit for smoothing said rectified voltage to produce a smoothed voltage as said predetermined d.c. output voltage, said converter further comprising:

a full-resonant circuit provided at at least one of said primary and said secondary sides of said transformer; and a clamp circuit connected to said main switching means and comprising a first capacitor and an auxiliary switching means serially connected to said first capacitor, said main switching means being supplied with a voltage having an amplitude defined by Vin/(1−D), said main and said auxiliary switching means being alternately put into an on state under control of said switching pulses.

2. A resonant DC-DC converter as claimed in claim 1, wherein said full-resonant circuit is connected to said secondary side of said transformer as a series resonant circuit, an output of said series resonant circuit being supplied to said rectifier circuit, said smoothing circuit being of a capacitor input type.

3. A resonant DC-DC converter as claimed in claim 1, wherein said full-resonant circuit is connected to said secondary side of said transformer as a parallel resonant circuit, an output of said parallel resonant circuit being supplied to said rectifier circuit, said smoothing circuit being of a choke input type.

4. A resonant DC-DC converter as claimed in claim 1, wherein said clamp circuit further comprises an inductor, said full-resonant circuit being connected between said inductor and said primary side of said transformer as a series resonant circuit, said smoothing circuit being of a capacitor input type.

5. A resonant DC-DC converter as claimed in claim 1, wherein said clamp circuit further comprises an inductor, said full-resonant circuit being connected between said inductor and said primary side of said transformer as a parallel resonant circuit, said smoothing circuit being of a choke input type.

6. A resonant DC-DC converter as claimed in one of claims 1 to 5, wherein said converter further comprises a switching pulse generation circuit for generating said switching pulses, said switching pulse generation circuit comprising:

an error amplifier supplied with a reference voltage and an output voltage of said smoothing circuit for amplifying a difference between said reference voltage and said output voltage of said smoothing circuit to produce an amplified error voltage;

a pulse width modulation control unit connected to said error amplifier for modulating a duty ratio in response to said amplified error voltage to produce a duty ratio modulated signal having a modulated duty ratio; and a drive circuit connected to said pulse width modulation control unit for generating said switching pulses having a constant frequency and a pulse width corresponding to said modulated duty ratio to supply said switching pulses to said main and said auxiliary switching means.

7. A resonant DC-DC converter as claimed in one of claims 1 to 5, wherein said converter further comprises a switching pulse generation circuit for generating said switching pulses, said switching pulse generation circuit comprising:

an error amplifier supplied with a reference voltage and an output voltage of said smoothing circuit for amplifying a difference between said reference voltage and said output voltage of said smoothing circuit to produce an amplified error voltage;

voltage-frequency converter connected to said error amplifier for converting said amplified error voltage into a variable frequency signal having a frequency which varies with said amplified error voltage;

a pulse width modulation control unit supplied with said input d.c. voltage for modulating a duty ratio in response to said input d.c. voltage to produce a duty ratio modulated signal having a modulated duty ratio; and a drive circuit connected to said voltage-frequency converter and said pulse width modulation control unit for generating said switching pulses having a frequency corresponding to said variable frequency signal and a pulse width corresponding to said modulated duty ratio to supply said switching pulses to said main and said auxiliary switching means.

8. A resonant DC-DC converter for converting a d.c. input voltage Vin into a predetermined d.c. output voltage and comprising main switching means for switching d.c. input voltage under control of switching pulses defined by a duty ratio D to supply an a.c. voltage to an inductor, a rectifier circuit connected to said inductor for rectifying said a.c. voltage to produce a rectified voltage, and a smoothing circuit connected to said rectifier circuit for smoothing said rectified voltage to produce a smoothed voltage as said predetermined d.c. output voltage, said converter further comprising:

a full-resonant circuit connected between said inductor and said rectifier circuit; and a clamp circuit connected to an input side of said inductor and said main switching means and comprising a first capacitor and an auxiliary switching means serially connected to said first capacitor, said main switching means being supplied with a voltage having an amplitude defined by Vin/(1−D), said main and said auxiliary switching means being alternately put into an on state under control of said switching pulses.

9. A resonant DC-DC converter as claimed in claim 8, wherein said full-resonant circuit is a series resonant circuit, said smoothing circuit being of a capacitor input type.

10. A resonant DC-DC converter as claimed in claim 8, wherein said full-resonant circuit is a parallel resonant circuit, said smoothing circuit being of a choke input type.

11. A resonant DC-DC converter as claimed in one of claims 8 to 10, wherein said converter further comprises a switching pulse generation circuit for generating said switching pulses, said switching pulse generation circuit comprising:
an error amplifier supplied with a reference voltage and an output voltage of said smoothing circuit for amplifying a difference between said reference voltage and said output voltage of said smoothing circuit to produce an amplified error voltage;
a pulse width modulation control unit connected to said error amplifier for modulating a duty ratio in response to said amplified error voltage to produce a duty ratio modulated signal having a modulated duty ratio; and
a drive circuit connected to said pulse width modulation control unit for generating said switching pulses having a constant frequency and a pulse width corresponding to said modulated duty ratio to supply said switching pulses to said main and said auxiliary switching means.

12. A resonant DC-DC converter as claimed in one of claims 8 to 10, wherein said converter further comprises a switching pulse generation circuit for generating said switching pulses, said switching pulse generation circuit comprising:
an error amplifier supplied with a reference voltage and an output voltage of said smoothing circuit for amplifying a difference between said reference voltage and said output voltage of said smoothing circuit to produce an amplified error voltage;
voltage-frequency converter connected to said error amplifier for converting said amplified error voltage into a variable frequency signal having a frequency which varies with said amplified error voltage;
a pulse width modulation control unit supplied with said input d.c. voltage for modulating a duty ratio in response to said input d.c. voltage to produce a duty ratio modulated signal having a modulated duty ratio; and
a drive circuit connected to said voltage-frequency converter and said pulse width modulation control unit for generating said switching pulses having a frequency corresponding to said variable frequency signal and a pulse width corresponding to said modulated duty ratio to supply said switching pulses to said main and said auxiliary switching means.

13. A resonant DC-DC converter for converting a d.c. input voltage Vin into a predetermined d.c. output voltage and comprising main switching means for switching said d.c. input voltage under control of switching pulses defined by a duty ratio D to supply an a.c. voltage to a full-resonant circuit, a rectifier circuit connected to said full-resonant circuit for rectifying said a.c. voltage to produce a rectified voltage, and a smoothing circuit connected to said rectifier circuit for smoothing said rectified voltage to produced a smooth voltage as said predetermined d.c. output voltage, said converter further comprising:
a clamp circuit connected to said main switching means and comprising a first capacitor and an auxiliary switching means serially connected to said first capacitor, said main switching means being supplied with a voltage having an amplitude defined by Vin/(1−D), said main and said auxiliary switching means being alternately put into an on state under control of said switching pulses.

14. A resonant DC-DC converter as claimed in claim 13, wherein said full-resonant circuit is a series resonant circuit, said smoothing circuit being of a capacitor input type.

15. A resonant DC-DC converter as claimed in claim 13, wherein said full-resonant circuit is a parallel resonant circuit, said smoothing circuit being of a choke input type.

16. A resonant DC-DC converter as claimed in one of claims 13 to 15, wherein said converter further comprises a switching pulse generation circuit for generating said switching pulses, said switching pulse generation circuit comprising:
an error amplifier supplied with a reference voltage and an output voltage of said smoothing circuit for amplifying a difference between said reference voltage and said output voltage of said smoothing circuit to produce an amplified error voltage;
a pulse width modulation control unit connected to said error amplifier for modulating a duty ratio in response to said amplified error voltage to produce a duty ratio modulated signal having a modulated duty ratio; and
a drive circuit connected to said pulse width modulation control unit for generating said switching pulses having a constant frequency and a pulse width corresponding to said modulated duty ratio to supply said switching pulses to said main and said auxiliary switching means.

17. A resonant DC-DC converter as claimed in one of claims 13 to 15, wherein said converter further comprises a switching pulse generation circuit for generating said switching pulses, said switching pulse generation circuit comprising:
an error amplifier supplied with a reference voltage and an output voltage of said smoothing circuit for amplifying a difference between said reference voltage and said output voltage of said smoothing circuit to produce an amplified error voltage;
voltage-frequency converter connected to said error amplifier for converting said amplified error voltage into a variable frequency signal having a frequency which varies with said amplified error voltage;
a pulse width modulation control unit supplied with said input d.c. voltage for modulating a duty ratio in response to said input d.c. voltage to produce a duty ratio modulated signal having a modulated duty ratio; and
a drive circuit connected to said voltage-frequency converter and said pulse width modulation control unit for generating said switching pulses having a frequency corresponding to said variable frequency signal and a pulse width corresponding to said modulated duty ratio to supply said switching pulses to said main and said auxiliary switching means.

18. A resonant DC-DC converter for converting a d.c. input voltage Vin into a predetermined d.c. output voltage and comprising a main switching device switching said d.c. input voltage under control of switching pulses defined by a duty ratio D to supply an a.c. voltage to a primary side of a transformer, a rectifier circuit connected to a secondary side of said transformer for rectifying an a.c. voltage derived from said secondary side to produce a rectified voltage, and a smoothing circuit connected to said rectifier circuit for smoothing said rectified voltage to produce a smoothed voltage as said predetermined d.c. output voltage, said converter further comprising:

a full-resonant circuit provided at at least one of said primary and said secondary sides of said transformer; and a clamp circuit connected to said main switching device and comprising a first capacitor and an auxiliary switching device serially connected to said first capacitor, said main switching device being supplied with a voltage having an amplitude defined by Vin/(1−D), said main and said auxiliary switching devices being alternately put into an on state under control of said switching pulses.

19. A resonant DC-DC converter for converting a d.c. input voltage Vin into a predetermined d.c. output voltage and comprising a main switching device switching d.c. input voltage under control of switching pulses defined by a duty ratio D to supply an a.c. voltage to an inductor, a rectifier circuit connected to said inductor for rectifying said a.c. voltage to produce a rectified voltage, and a smoothing circuit connected to said rectifier circuit for smoothing said rectified voltage to produce a smoothed voltage as said predetermined d.c. output voltage, said converter further comprising:

a full-resonant circuit connected between said inductor and said rectifier circuit; and a clamp circuit connected to an input side of said inductor and said main switching device and comprising a first capacitor and an auxiliary switching device serially connected to said first capacitor, said main switching device being supplied with a voltage having an amplitude defined by Vin/(1−D), said main and said auxiliary switching devices being alternately put into an on state under control of said switching pulses.

20. A resonant DC-DC converter for converting a d.c. input voltage Vin into a predetermined d.c. output voltage and comprising a main switching device switching said d.c. input voltage under control of switching pulses defined by a duty ratio D to supply an a.c. voltage to a full-resonant circuit, a rectifier circuit connected to said full-resonant circuit for rectifying said a.c. voltage to produce a rectified voltage, and a smoothing circuit connected to said rectifier circuit for smoothing said rectified voltage to produced a smooth voltage as said predetermined d.c. output voltage, said converter further comprising:

a clamp circuit connected to said main switching device and comprising a first capacitor and an auxiliary switching device serially connected to said first capacitor, said main switching device being supplied with a voltage having an amplitude defined by Vin/(1−D), said main and said auxiliary switching devices being alternately put into an on state under control of said switching pulses.

* * * * *